(12) United States Patent
Clayton et al.

(10) Patent No.: US 11,686,477 B2
(45) Date of Patent: *Jun. 27, 2023

(54) COOKING APPLIANCE WITH AN IMAGING DEVICE

(71) Applicant: WHIRLPOOL CORPORATION, Benton Harbor, MI (US)

(72) Inventors: Alexander L. Clayton, St. Joseph, MI (US); Brandon Satanek, Stevensville, MI (US); Michael Tsai, St. Joseph, MI (US); Christopher Cullen, Stevensville, MI (US); Heng Tong Pit, St. Joseph, MI (US); Donald John Gilmore, Berrien Springs, MI (US); Cristiano Vito Pastore, Comerio (IT); Matthew P. Ebrom, Holland, MI (US); Pallavi Manjrekar, Stevensville, MI (US); Bruce Wiatrak, Bolingbrook, IL (US); John Doyle, Brunello (IT); Joshua Abdoo, Stevensville, MI (US); Ariana Bruno, St. Joseph, MI (US); Neomar Giacomini, St. Joseph, MI (US); Tamara Distaso, Cassinetta (IT); Gianpiero Santacatterina, Cassinetta (IT); Seth Herndon, Benton Harbor, MI (US)

(73) Assignee: Whirlpool Corporation, Benton Harbor, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 17/675,240

(22) Filed: Feb. 18, 2022

(65) Prior Publication Data

US 2022/0170644 A1 Jun. 2, 2022

Related U.S. Application Data

(63) Continuation of application No. 16/728,426, filed on Dec. 27, 2019, now Pat. No. 11,287,140.

(Continued)

(51) Int. Cl.
*G06F 3/041* (2006.01)
*F24C 7/08* (2006.01)
(Continued)

(52) U.S. Cl.
CPC ............ *F24C 7/086* (2013.01); *F24C 3/124* (2013.01); *G06F 3/04842* (2013.01); *G06V 20/20* (2022.01); *G06V 40/20* (2022.01)

(58) Field of Classification Search
CPC .......... F24C 7/086; F24C 3/124; F24C 7/085; F24C 15/04; G06F 3/04842; G06V 20/20; G06V 40/20
(Continued)

(56) References Cited

U.S. PATENT DOCUMENTS 3,145,289 A 8/1964 Swetlitz
4,914,781 A 4/1990 Sokn et al.
(Continued)

FOREIGN PATENT DOCUMENTS

BE 1020505 A3 11/2013
CN 205410942 U 8/2016
(Continued)

OTHER PUBLICATIONS

Suvie: Kitchen Robot with Multi-Zone Cooking and Refrigeration accessed at https://www.kickstarter.com/projects/1483909118/suvie-kitchen-robot-with-multi-zone-cooking-and-re, accessed Aug. 28, 2020.

*Primary Examiner* — Thuy N Pardo
(74) *Attorney, Agent, or Firm* — McGarry Bair PC

(57) ABSTRACT

A cooking appliance can include a cooking chamber and an imaging device for capturing an image of a food item inside
(Continued)

the chamber. The appliance can include a transparent, touch-screen display for displaying the interior contents of the cooking appliance to a user without requiring the user to open the cooking appliance, as well as providing for the user controlling, operating, and interacting with the cooking appliance.

19 Claims, 30 Drawing Sheets

Related U.S. Application Data

(60) Provisional application No. 62/788,443, filed on Jan. 4, 2019.

(51) Int. Cl.
*F24C 3/12* (2006.01)
*G06F 3/04842* (2022.01)
*G06V 20/20* (2022.01)
*G06V 40/20* (2022.01)

(58) Field of Classification Search
USPC .......................................... 345/156, 173, 174
See application file for complete search history.

(56) References Cited

U.S. PATENT DOCUMENTS

| | | | |
|---|---|---|---|
| 6,361,181 B1 | 3/2002 | Bales | |
| 7,157,667 B2 | 1/2007 | Gramlich et al. | |
| 7,696,454 B2 | 4/2010 | Nam et al. | |
| 7,874,690 B2 | 1/2011 | Weber, III et al. | |
| 7,964,824 B2 | 6/2011 | Moon | |
| 8,138,459 B2 | 3/2012 | Beausse | |
| 8,147,888 B2 | 4/2012 | Kling et al. | |
| 8,218,402 B2 | 7/2012 | Lewis et al. | |
| 8,277,065 B2 | 10/2012 | Camarillo Fernandez et al. | |
| 8,330,083 B2 | 12/2012 | Moon et al. | |
| 8,455,028 B2 | 6/2013 | Breunig et al. | |
| D693,627 S | 11/2013 | Moon et al. | |
| 8,654,515 B2 | 2/2014 | Krische | |
| 8,835,810 B2 | 9/2014 | Moon | |
| D714,583 S | 10/2014 | Kwon et al. | |
| 8,928,585 B2 | 1/2015 | Mondragon et al. | |
| D734,091 S | 7/2015 | Moon et al. | |
| 9,149,058 B2 | 10/2015 | Bilet et al. | |
| 9,226,343 B2 | 12/2015 | Moon et al. | |
| 9,297,538 B2 | 3/2016 | Hargrave et al. | |
| 9,310,085 B2 | 4/2016 | Breunig et al. | |
| 9,329,589 B2 | 5/2016 | Dadlani Mahtani et al. | |
| 9,464,376 B2 | 10/2016 | Kim | |
| 9,588,592 B2 | 3/2017 | Koshiyama et al. | |
| 9,591,946 B1 * | 3/2017 | Valdes | A22C 17/0066 |
| 9,598,811 B2 | 3/2017 | Lee et al. | |
| 9,644,847 B2 | 5/2017 | Bhogal et al. | |
| 9,648,667 B2 | 5/2017 | Moon et al. | |
| 9,833,101 B2 | 12/2017 | Moon et al. | |
| 10,024,544 B2 | 7/2018 | Bhogal et al. | |
| 10,098,187 B2 | 10/2018 | Moon et al. | |
| 10,973,358 B1 * | 4/2021 | Bourgeois | A47J 37/1242 |
| 2004/0264168 A1 | 12/2004 | Gotz et al. | |
| 2005/0109333 A1 * | 5/2005 | Thomas | F24C 7/082 126/39 BA |
| 2007/0271512 A1 | 11/2007 | Knight et al. | |
| 2013/0093655 A1 | 4/2013 | Holzgreve et al. | |
| 2014/0026762 A1 | 1/2014 | Riefenstein | |
| 2015/0053094 A1 * | 2/2015 | Conti | A47J 37/0807 99/390 |
| 2015/0056344 A1 | 2/2015 | Luckhardt | |
| 2016/0327281 A1 | 11/2016 | Bhogal et al. | |
| 2016/0348918 A1 | 12/2016 | Bhogal et al. | |
| 2017/0006669 A1 | 1/2017 | Kamei et al. | |
| 2017/0074522 A1 | 3/2017 | Cheng | |
| 2017/0105572 A1 | 4/2017 | Matloubian et al. | |
| 2017/0115008 A1 | 4/2017 | Erbe et al. | |
| 2017/0122568 A1 | 5/2017 | Ivanovic et al. | |
| 2017/0170978 A1 | 6/2017 | Luckhardt et al. | |
| 2017/0199658 A1 | 7/2017 | Stoufer et al. | |
| 2017/0205078 A1 | 7/2017 | Hildner et al. | |
| 2017/0208652 A1 | 7/2017 | Luckhardt et al. | |
| 2018/0003395 A1 | 1/2018 | Reinhard-Herrscher et al. | |
| 2018/0010806 A1 | 1/2018 | Monroy et al. | |
| 2018/0130466 A1 | 5/2018 | Beifuss et al. | |
| 2018/0232105 A1 | 8/2018 | Hatipoglu et al. | |
| 2018/0292093 A1 | 10/2018 | Bhogal et al. | |
| 2018/0324908 A1 | 11/2018 | Denker et al. | |
| 2019/0139446 A1 | 5/2019 | Cheng et al. | |
| 2019/0285483 A1 * | 9/2019 | Cheng | G01K 1/026 |
| 2020/0005690 A1 | 1/2020 | Gottsov et al. | |
| 2020/0208915 A1 * | 7/2020 | Käser | F27D 19/00 |
| 2021/0045580 A1 * | 2/2021 | Jennings | A47J 39/006 |
| 2021/0071565 A1 * | 3/2021 | Joe | H05B 1/0297 |

FOREIGN PATENT DOCUMENTS

| | | |
|---|---|---|
| DE | 3827528 A1 | 8/1989 |
| DE | 3808716 A1 | 9/1989 |
| DE | 102007048834 A1 | 4/2008 |
| DE | 102008043446 A1 | 5/2010 |
| DE | 102008043722 A1 | 5/2010 |
| DE | 102011080073 A1 | 1/2013 |
| DE | 102013105697 A1 | 12/2014 |
| DE | 102013110642 A1 | 3/2015 |
| DE | 202015103727 U1 | 10/2016 |
| DE | 202015103729 U1 | 11/2016 |
| EP | 3716269 A1 | 6/1996 |
| EP | 1995522 B1 | 1/2011 |
| EP | 2390576 A1 | 11/2011 |
| EP | 2336644 B1 | 3/2013 |
| EP | 2653786 B1 | 7/2017 |
| EP | 2951809 B1 | 8/2017 |
| ES | 2396809 | 2/2013 |
| FR | 2474654 A1 | 7/1981 |
| FR | 2636410 A1 | 3/1990 |
| GB | 2466397 A1 | 6/2010 |
| KR | 20170062852 A | 6/2017 |
| WO | 2014118295 A1 | 8/2014 |
| WO | 2016034295 A1 | 3/2016 |
| WO | 2016128370 A1 | 8/2016 |
| WO | 2016128372 A1 | 8/2016 |
| WO | 2018042962 A1 | 3/2018 |
| WO | 2018072641 A1 | 4/2018 |

* cited by examiner

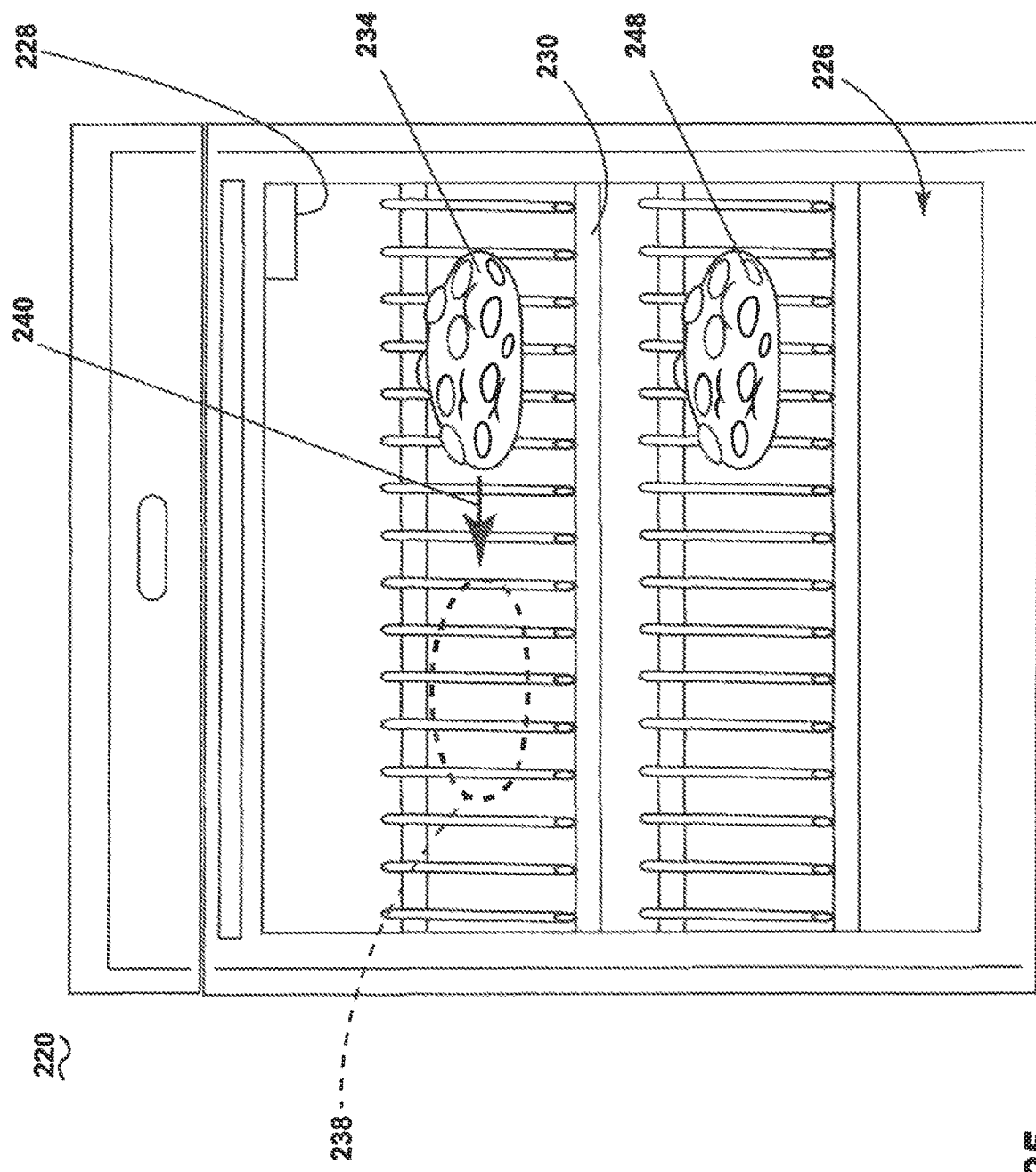

COOKING APPLIANCE WITH AN IMAGING DEVICE

CROSS-REFERENCE TO RELATED APPLICATIONS

This application is a continuation application of U.S. patent application Ser. No. 16/728,426, filed on Dec. 27, 2019, now U.S. Pat. No. 11,287,140, issued Mar. 29, 2022, which claims the benefit of U.S. Provisional Patent Application No. 62/788,443, filed Jan. 4, 2019, both of which are hereby incorporated herein by reference in their entirety.

BACKGROUND

Household appliances typically have a user interface through which the user controls the operation of the appliance. A common configuration is to locate the user interface on a front of the appliance, such as on or adjacent a door. The door can also include a window providing the user with a view of the interior of the appliance without having to open the door. In a more recent configuration, the user interface is a transparent, touch screen overlying the window. The transparent, touch screen can be displayed on all or part of the window when being used and then disappear when not, leaving the entire window for viewing.

SUMMARY

In one aspect, the disclosure relates to a cooking appliance comprising: a chassis defining a cooking chamber and having an access opening, a heating element located within the chassis, a door pivotably mounted to the chassis including a window for viewing the cooking chamber through the door, and the door being movable between a closed position to close the access opening and an opened position to open the access opening, a transparent, touchscreen display provided on the door, a first camera mounted to the chassis for imaging the cooking chamber interior of the chassis and configured to generate a first signal representative an image of a food item and a rack contained within the cooking chamber for display on the transparent, touchscreen display, and a controller communicatively and operably coupled to the transparent, touchscreen display and the first camera, and configured to receive the first signal and display the image of the food item and the rack contained within the cooking chamber on the transparent, touchscreen display and configured to determine an alternate position of one of the food item or the rack based on the first signal and display an augmented image of the food item or the rack in the alternate position within the cooking chamber on the transparent.

BRIEF DESCRIPTION OF THE DRAWINGS

In the drawings:

FIG. 25 is a front view of another oven with a transparent, touchscreen display illustrating an alternative position for a food item within the oven to prevent an obscured view of a camera.

DESCRIPTION OF EMBODIMENTS OF THE INVENTION

The disclosure relates to household appliances having a transparent, touch screen user interface overlaying a window of the appliance. The window, while illustrated on a door, can be located on other areas of the appliance. While the disclosure is written in the context of an oven with a door having a window and the transparent, touch screen user interface on the window, the disclosure is applicable to any type of appliance with a window, including, without limitation, a refrigerator, microwave, toaster oven, dishwasher, clothes washer, and dryer.

Figure 1:
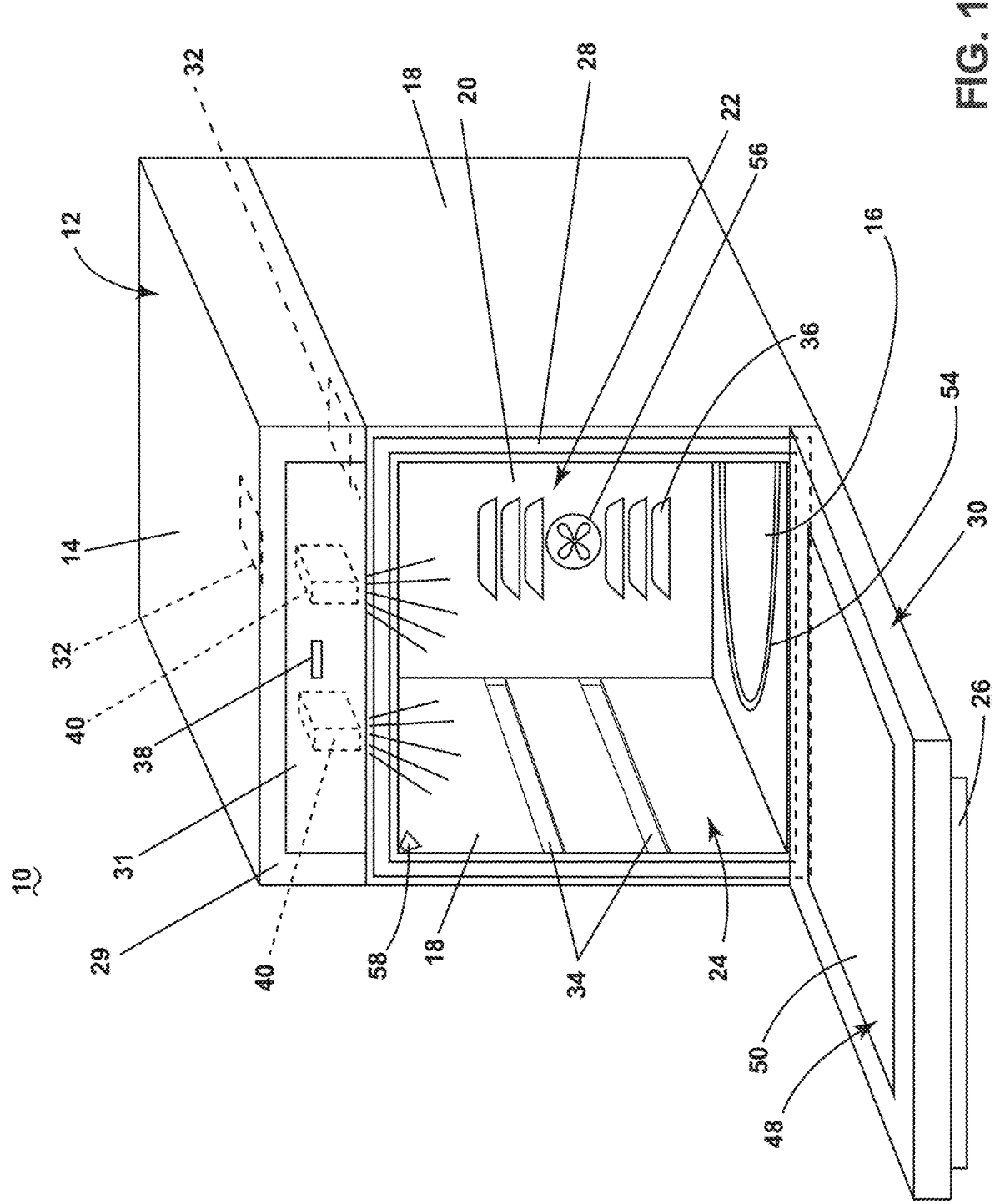
FIG. 1 is a perspective view of an oven with a transparent, touchscreen user interface on a door of the oven, with the door in an open position.

Referring to FIG. 1, a household cooking appliance is shown in the form of an oven 10 and can be used for cooking one or more food items. The oven 10 can include an outer chassis 12 including a top wall 14, a bottom wall 16, opposing sidewalls 18, and a rear wall 20 to define an interior 22 forming a cooking chamber for the oven 10. An access opening 24 is provided opposite the rear wall 20 for accessing the interior 22. A door 30 can be pivotably mounted to the chassis 12 at the bottom wall 16, pivotable between an open position (FIG. 1) providing access to the interior 22 at the access opening 24 and a closed position (FIG. 2), closing the interior 22 at the access opening 24. A gasket 28 can be provided on the edges of the top wall 14, the bottom wall 16, and the sidewalls 18 for sealing the interior 22 at the door 30 when the door 30 is in the closed position. A handle 26 can be provided on the door 30 for selectively moving the door 30 between the opened position and the closed position. A front panel 29 is provided on the chassis 12 above the access opening 24. Additionally, a mask 31 is at least partially provided on the front panel 29, while the mask 31 extends onto the front of the door 30 (best seen in FIG. 2). The mask 31 can be opaque, preventing a user viewing portions of the oven 10 through the mask 31.

A first camera 32, schematically illustrated in broken line and shown in two alternative positions, can be provided on the top wall 14 for viewing the interior 22 of the oven 10, while any position for the camera to view the interior 22 is contemplated. The first position for the first camera 32 is in the center of the top wall 14. While the camera 32 is shown as centrally provided on the top wall 14, it is contemplated that the camera 32 can be provided at any position suitable for viewing the interior of the oven 10. In the second alternate position, the camera 32 is provided at the front-right portion of the oven, when viewed from the front. It should be appreciated that multiple different positions for the interior camera 32 are contemplated, and that the two positions are shown to illustrate the variability of positioning the first camera 32. Additionally, multiple interior cameras 32 are contemplated to record and generate a three-dimensional image of a food item within the oven based upon the different recorded angles from the multiple cameras.

The camera 32 can provide for imaging and recognizing a food item that is provided within the oven 10, or generating an image of a food item contained within the interior 22.

More specifically, the camera 32 can generate a signal representing an image or video, which can be provided to a controller for interpreting the signal. In one example, the oven 10 can automatically cook the food item based upon recognition of the food item and monitoring throughout the cooking process. Alternatively, the camera 32 can be used to image the food item for monitoring by the user via a display, without requiring the user to open the oven 10 to inspect the food item as it cooks. Further still, the camera 32 can include a zoom feature, as well as digital zoom or panning within range of the camera 32, to permit closer inspection of different portions of the food item. In one example, the camera 32 can record images at a quality suitable for high definition reproduction at a 1920×1080 screen resolution, while other resolutions or qualities are contemplated. While described as a camera, any suitable sensor for imaging or recording the interior 22 or portions in front of the oven 10 is contemplated, such as a thermo-imaging sensor, for example.

Additionally, a second camera 38 can be provided on the front panel 29 for viewing the area in front of the oven 10, such as a user using the oven 10. The second camera 38 can be programmed to identify a user, such as facial recognition, or to focus on the eyes of a user or a position thereof to track where the user is looking at the oven 10. More specifically, the camera 32 can generate a signal representing an image or video, which can be provided to a controller for interpreting the signal. Such a signal can be interpreted to determine a user's face, such as by using facial recognition software or eye identification software. Additionally, one or more users can be stored in a controller, such that the oven 10 can recognize a particular user based upon the facial or eye recognition. Furthermore, the second camera 38 can utilizing image analysis to determine height, sideways position of the user, as well as depth from the oven 10, such that the camera 38 can be used to detect at least two or up to three axes to accurately determine a user's position or movement. For example, the second camera 38 can be used to determine a lateral or side-to-die movement of the user. Additionally, the second camera 38 can be used to determine a distance of the user from the oven 10.

A set of rails 34 are provided on the sidewalls 18 for mounting one or more racks (FIG. 4) in the interior 22. While only one set of rails 34 are shown, it should be understood that a complementary set of rails are provided on the other sidewall 18, obscured by the perspective view of FIG. 1. Furthermore, while only two rails 34 are shown, any number of rails is contemplated.

An optional set of vents 36 can be provided on the rear wall 20 facing the interior 22 for passing a volume of air into or out of the interior 22, such as for circulating a flow of heated air to provide for a convection cycle for the oven 10. The vents 36 can include one or more openings into the interior 22, while the particular louvers or covers can be formed in a way to hide the openings from view from the front. More specifically, the openings of the vents 36 can face the bottom wall 16, for example. Alternatively, the rear wall 20 can have no visible structure, and can include a flat back panel.

Furthermore, additional elements or components can be provided in the interior of the oven 10, such as a sensor 58, a heating element 54, and a fan 56. The sensor 58 need not be a single sensor 58, but can be multiple different sensors for making measurements of the interior of the oven 10. Exemplary sensors can include but are not limited to a temperature sensor, an infrared sensor, a food temperature probe, or a rack sensor. The heating element 54 can be a gas heater or an electric heater, for example.

Lights 40 are provided on the top wall 14 for illuminating the interior 22 of the oven 10. While shown as positioned in the top wall 14 near the front of the oven 10, the lights can be positioned anywhere to suitably illuminate the interior 22 of the oven as well as the door 30 when in the closed position. The lights 40 can also be used to illuminate the door 30 and a display 48 on the door 30. In one example, the lights 40 can be used to passively light the door 30 and display 48, effectively lighting the display 48 via ambient light reflected about the interior 22 of the oven. In another example, the lights 40 can actively light the door 30 and the display 48, with the lights 40 being dedicated to lighting the display 48 and directing light toward the display 48. Furthermore, the lights 40 can be tailored to either the door 30 or the camera 38, or both. More specifically, the lights 40 can be tailored to illuminate the door 30 or the display thereon, including a transparent, touchscreen display, discussed in detail herein. Additionally, the lights 40 can be tailored to the camera 38, such as being an ultraviolet light when the camera 38 is an ultraviolet imaging camera.

A display 48 including a user interface 50 is provided on the door 30. The display 48 can be a transparent, touchscreen display, permitting a user to selectively view the interior of the oven 10 based upon the imaging provided on the current user interface 50. In one example, the display can be a liquid crystal display (LCD), and can be self-lit or backlit. Alternatively, the display can be a light emitting diode (LED) display that can be self-lit, such as using organic LEDs or active matrix, organic LEDs, for example. Additionally, the user interface 50 can provide for control and operation of the oven 10, as well as facilitating use of the appliance through user interaction with the user interface 50. More specifically, the user interface can include an interactive interface, such as a software program shown on the display 48. The user can interact with the user interface 50 by touching or otherwise manipulating the user interface 50. Such interaction with the user interface 50 can be used by the user to control operation of the oven 10, as well as facilitate use of the oven 10. For example, the user interface can provide information to the user related to operation of the oven 10, or other relevant information such as recipe information or other cooking-related information.

Figure 2:
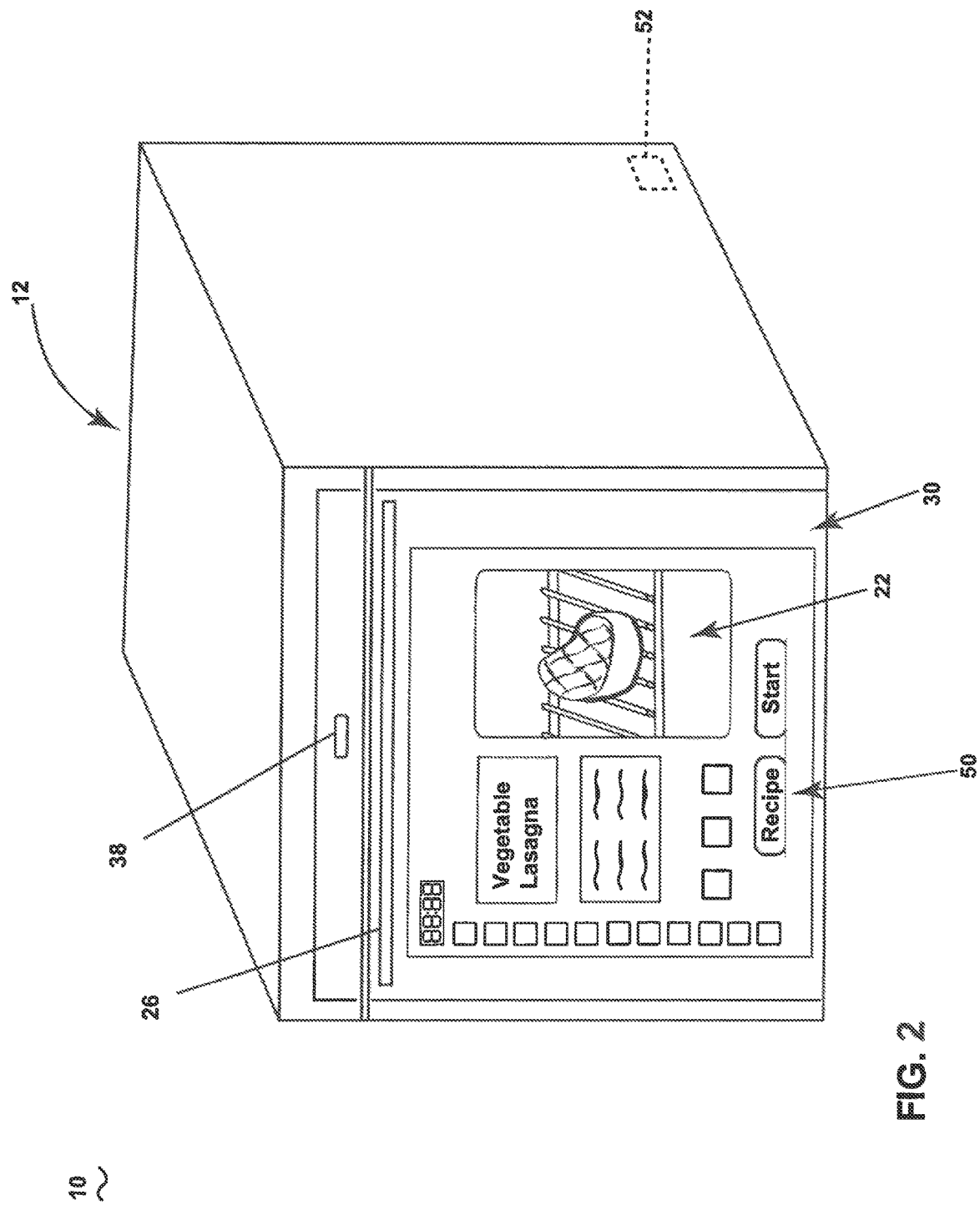
FIG. 2 illustrates another perspective view of the oven of FIG. 1 with the door in the closed position.

Referring to FIG. 2, the door 30 is shown in the closed position, sealing the interior 22 of the oven 10, with a system provided on the user interface 50 permitting a user to interact with the oven 10. The user interface 50 and system thereon as shown is exemplary, and should not be limiting of the oven 10.

A controller 52 can be provided within the oven 10 for controlling operation of the oven 10, as well as sending and receiving information to the user interface 50 for interaction with the user. The additional front, external camera 38 can be provided on the oven 10 for viewing a user interacting with the oven 10, and can be in communication with the controller 52.

When the door 30 is in the closed position, the user interface 50 can be operational and illuminated, permitting interaction by the user. Alternatively, the user interface 50 can be operated by a timer when the oven is not in use, but the door is in the closed position, turning off the display 48 when not in use. Furthermore, when the door 30 is in the opened position, the display 48 can be turned off, as the user will not be able to view the display 48 with the door opened. The user interface 50 can further display an image of a food item contained within the interior 22. The image can be an augmented image, for example, or can be generated as a three-dimensional image of the food item.

While the interior 22 is currently visible through a transparent portion of the user interface 50, it is further contemplated that the portion of the user interface 50, as shown, can include an augmented reality image of a food item being cooked or to be cooked. In one example, a user can select a desired food item to be cooked, and the user interface 50 can provide a virtual or augmented three-dimensional image of the final result, or preview the final cooking result along the cooking process.

Figure 3:
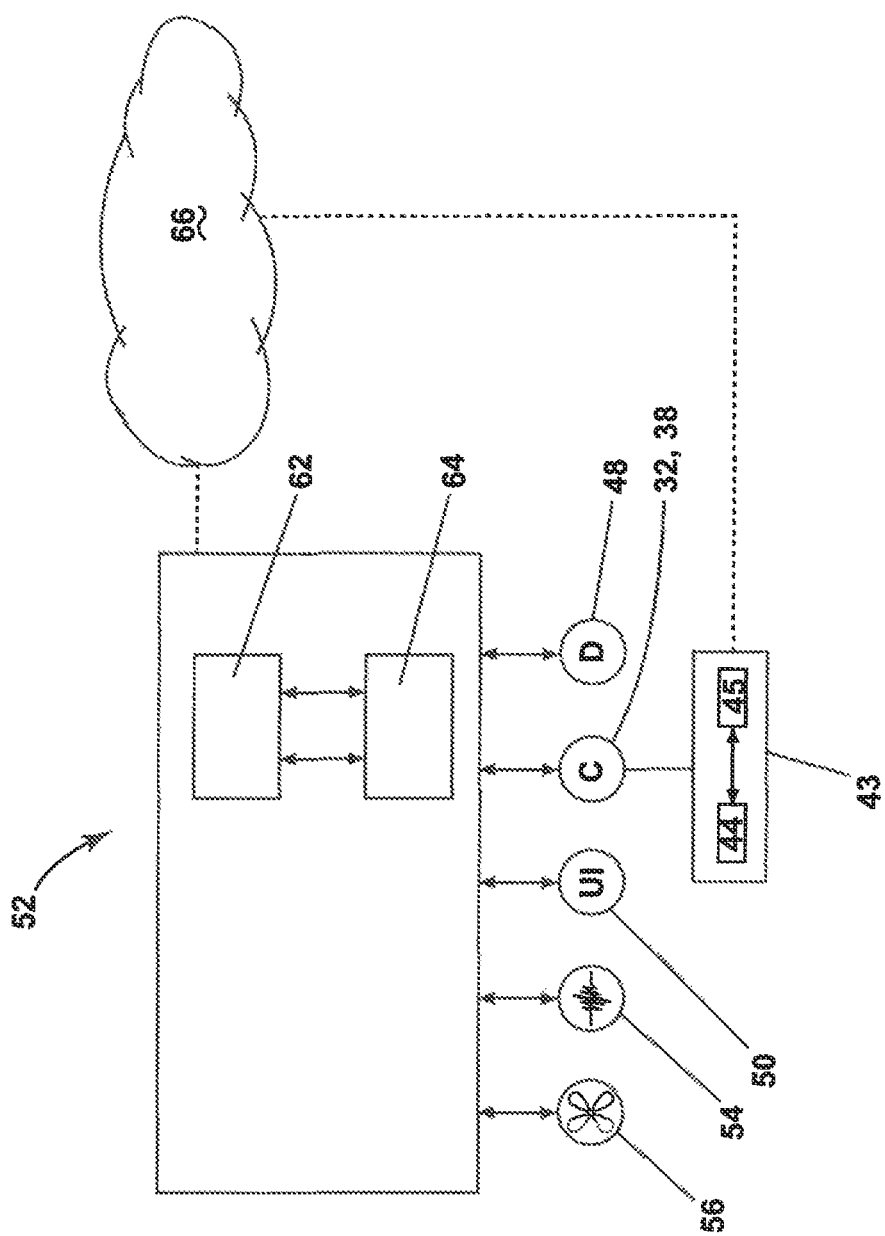
FIG. 3 is a schematic view of an electronics system utilized in the oven of FIG. 1.

FIG. 3 is a schematic view of the controller 52 coupled to the various components of the oven 10. The controller 52 can be operably and communicably coupled to components of the oven 10 such as the heating element 54, the fan 56 that can be incorporated near or behind the vents 36, the sensor 58, the user interface 50, the cameras 32, 38, and the display 48 to either control these components and/or receive their input for use in controlling the components.

The controller 52 can implement a heating cycle selected by the user according to any options selected by the user and provide related information to the user. The controller 52 can also include a central processing unit (CPU) 62 and an associated memory 64 where various operational procedures may be stored. One or more software applications, such as an arrangement of executable commands/instructions may be stored in the memory 64 and executed by the CPU 62 to implement the operational procedures. The controller 52 can be in communication with the cameras 32, 38 that the images can be output by the cameras 32, 38 and input to the controller 52. The controller 52 can output the images to the display 48 or another display, such as a mobile device display in order for a user to remotely monitor the contents being cooked. It is also contemplated that the cameras 32, 38 can also include a separate controller 43, CPU 44, and memory 45 dedicated to the cameras 32, 38, as well as the display 48. The controller 52 can be in communication with a network 66, such as the internet. The network 66 can include wired, wireless, or a combination of wired and wireless points or nodes to connect communication paths for exchanging and transporting data. Thus, the images from the camera 38 can be sent to a mobile device via the network 66 from the controller 52. The cameras 32, 38 can be directly coupled to the controller 52 or indirectly coupled to the controller 52 via the network 66.

The cameras 32, 38 or controller 52 can include an image recognition algorithm that can be implemented as a program in the controller 52 for measuring or recording items within the oven 10 and interpreting information related to such items, such as size, type, or position. The image recognition algorithm can also decide to discard images such as blurry images that are output by the camera 38 or provide unsuitable data as requested by the controller 52.

Figure 4:
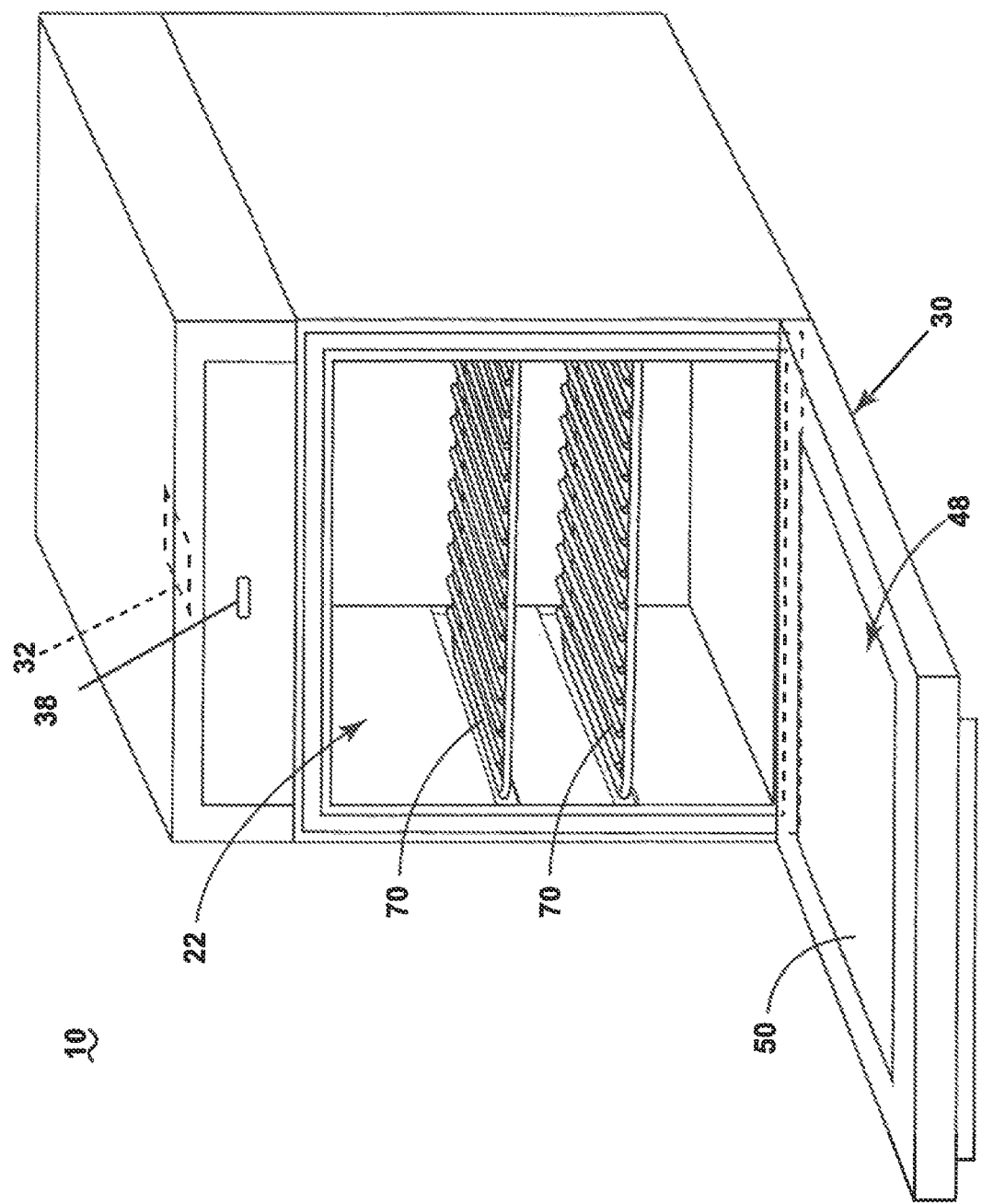
FIG. 4 is a perspective view of the oven of FIG. 1 with racks provided in the oven.

Referring to FIG. 4, the oven 10 can include one or more racks 70, shown as two exemplary racks 70. The racks 70, as well as the rest of the interior surfaces of the oven 10 facing the interior 22 can be colored or coated to have a color that will reduce, minimize, or eliminate visual interference with the transparent, touchscreen display 48. In one example, the interior 22 and the racks 70 can be white or an off-white, such as a cream color, and made of a ceramic material or porcelain material to withstand the higher temperatures of the oven 10. Furthermore, additional paneling or cladding can be provide along the interior of the oven 10, forming or overlying the interior walls having the coloring or coating to backlight the display and minimize visual interference. As the display 48 is the transparent, touchscreen display, it should be understood that different interior colorations and food items can interfere with or obscure the transparent user interface 50, and particular color schemes can be utilized to minimize, reduce, or eliminate any potential interference when viewing the user interface 50 with the door 30 in the closed position. Alternatively, it is contemplated that the interior 22 can include a particular pattern, which can be used by the camera 32 and the controller 52 to distinguish portions of the oven from food items, to defining a portion of a food recognition system.

The internal camera 32 can also be used to detect the racks 70 or the position, such as height or level, of the racks 70. Such a determination can be used by the oven 10 to recommend a proper cooking position for the racks 70 to a user.

Figure 5:
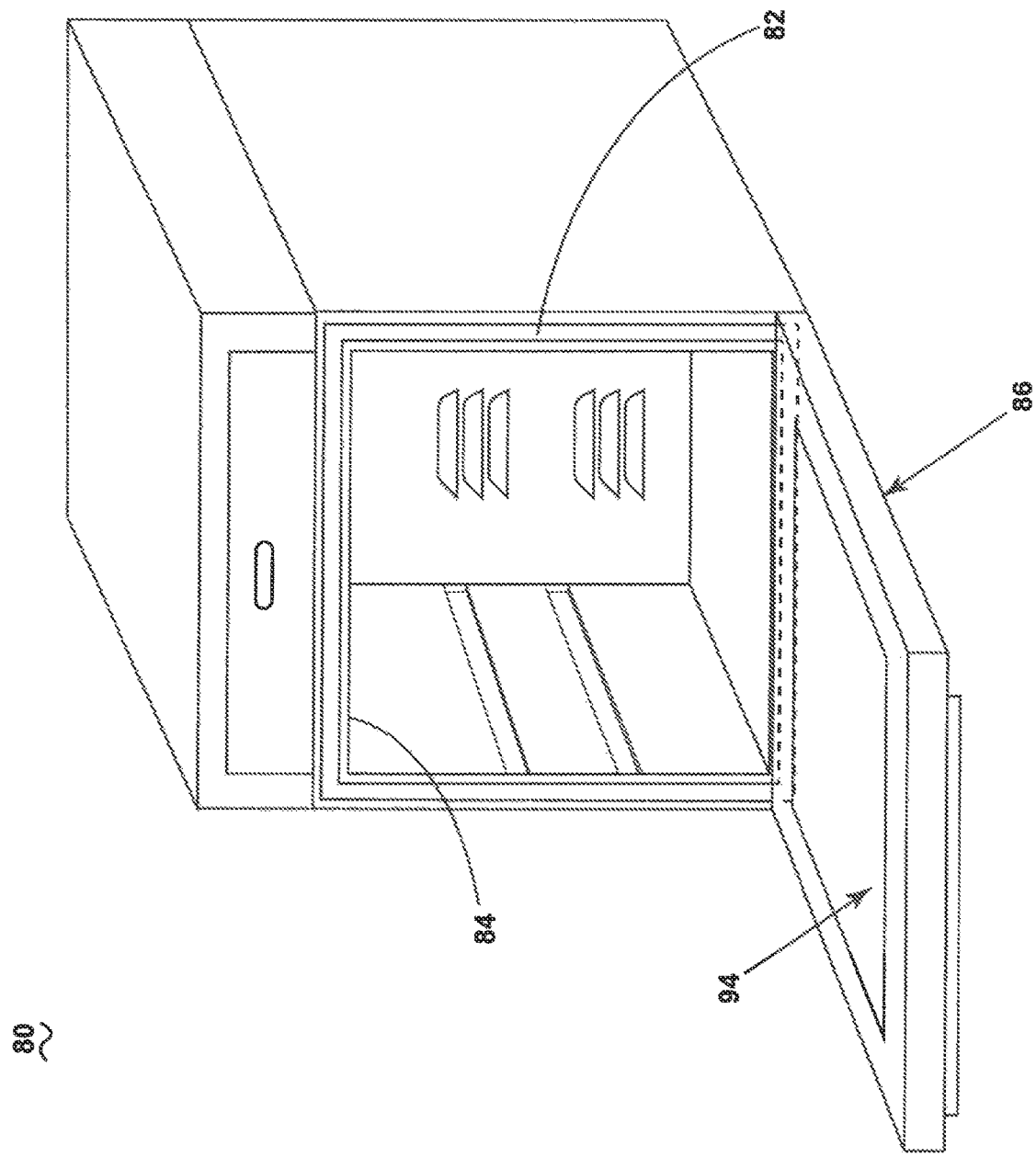
FIG. 5 is another perspective view of the oven of FIG. 1 with a door gasket.
Figure 6:
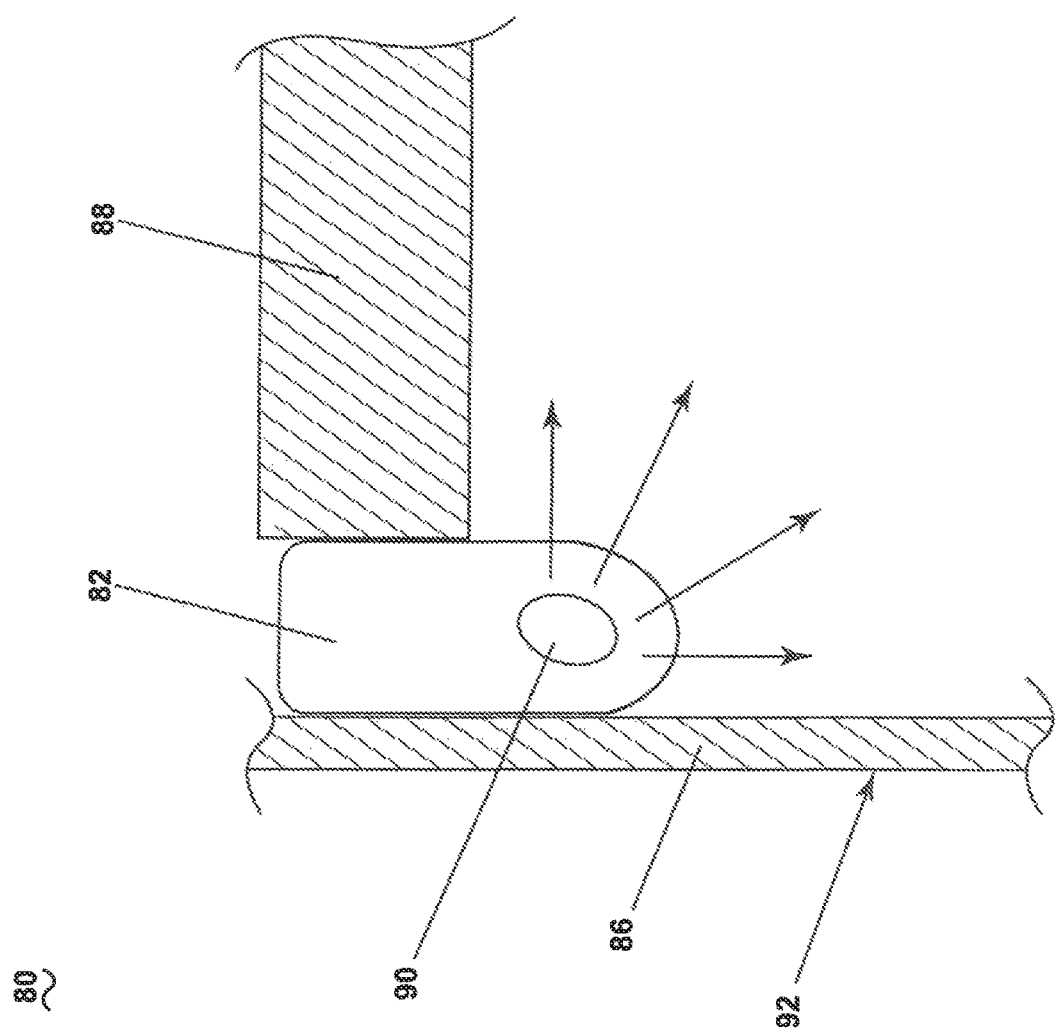
FIG. 6 is a section view of the door of FIG. 5 in the closed position showing a light strip within the gasket.

Referring now to FIG. 5, another exemplary oven 80 is shown, which can be substantially similar to the oven 10 described in FIGS. 1-4. A lighting gasket 82 is provided around an opening 84 of the oven 80 for sealing an oven door 86 when moved into a closed position. The lighting gasket 82 can provide for illuminating the cooking chamber within the oven 80 to backlight a display 94 on the door 86, or can be used to directly lighting the display 94. Referring to FIG. 6, showing a section view of the door 86 in a closed position, the door 86 is provided in the closed position and the gasket 82 is sandwiched between the door 86 and a chassis 88. The gasket 82 can be made of a flexible sealing element capable of withstanding the heightened temperatures of the oven 80, such as a Kevlar or a high temperature polymer.

A light 90 can be provided in the lighting gasket 82. The light 90 can be an elongated light strip, for example, extending along the entirety of the gasket 82. The light 90 can be used to illuminate and light a transparent, touchscreen display user interface 92 on the door 86 at the display 94. Such a light 90 can provide for suitably illuminating the user interface 92 without excessively illuminating the remainder of the interior of the oven 80 or items contained therein, such as a rack or food items. In this way, the user interface 92 is suitably lit for operation of the transparent, touchscreen display, without excessively lighting the interior of the oven 80, which reduces any undesirable interference with the user interface 92. In this way, the user interface 92 is well lit for interaction by a user without visual interference or impairment from the remainder of the interior of the oven 80.

Figure 7:
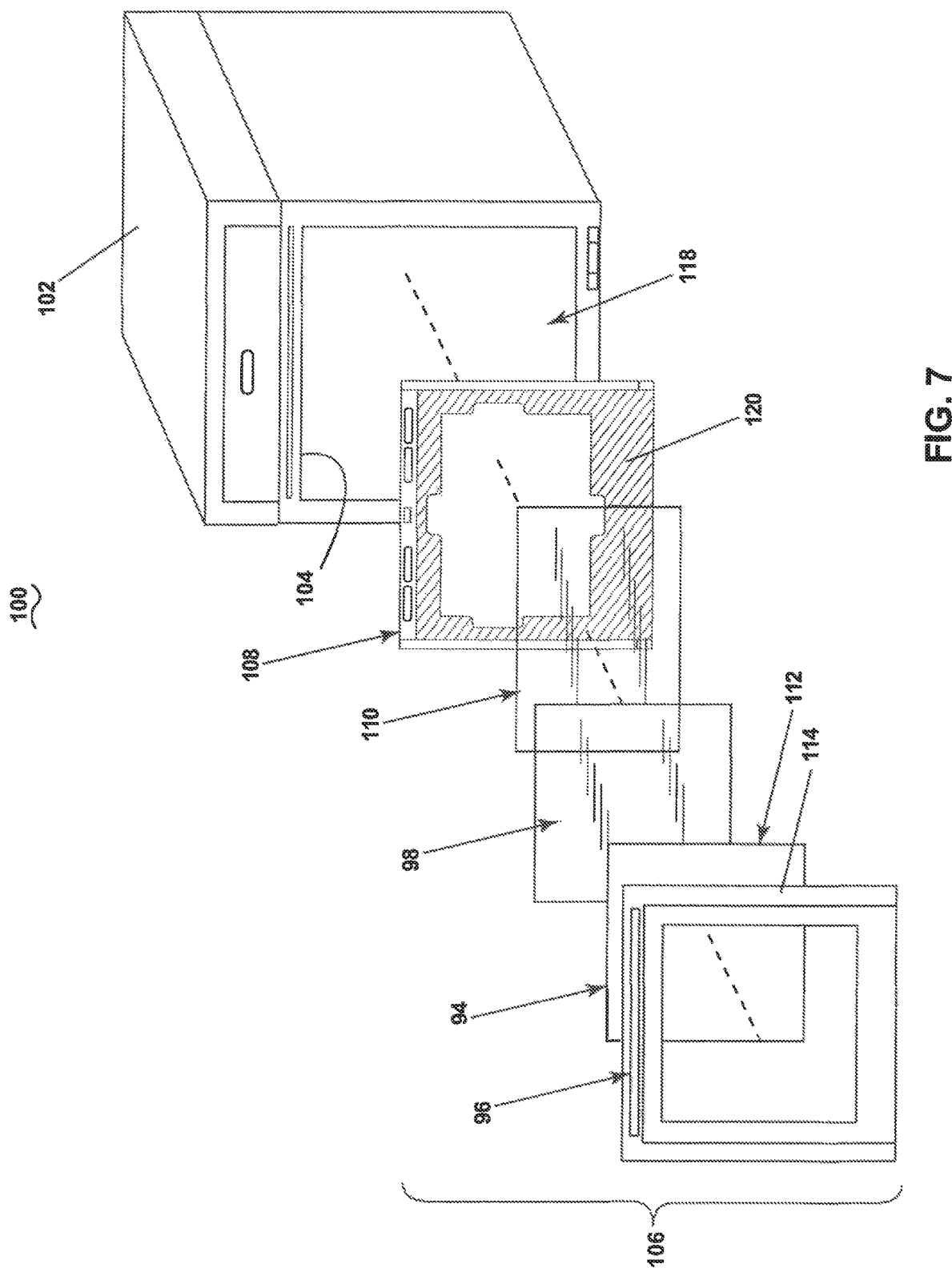
FIG. 7 is an exploded view of a two-part door for an oven including a transparent, touchscreen user interface.

FIG. 7 is an exploded view of another alternative oven 100 with a chassis 102 defining an access opening 104. A door 106 can be pivotably mounted to the chassis 102, while shown in FIG. 7 exploded from the chassis 102. The door 106 can include an inner frame 108, an inner glass 110, an outer frame 96, and outer glass 98, and a transparent touch screen 94 applied to the outer glass 98. The outer frame 96, outer glass 98, and transparent touch screen 94 can form a display 112 including a transparent, touchscreen user interface 114. The inner glass 110 can couple to the inner frame 108 and the outer glass 98 can couple to the outer frame 96. Furthermore, the outer frame 96 can couple to the inner frame 108 to form the door 106. The inner frame 108 and inner glass 110 can separate the display 112 from an interior 118 of the oven 100, shielding the display 112 from the heightened temperatures of the oven 100. Additionally, a mask 120 can be provided on the inner frame 108 to hide electrical components connected to the user interface 114 for powering and communicating with the user interface 114. One or more gaps 122 can be formed in the mask 120, shown as an exemplary four gaps 122.

Figure 8:
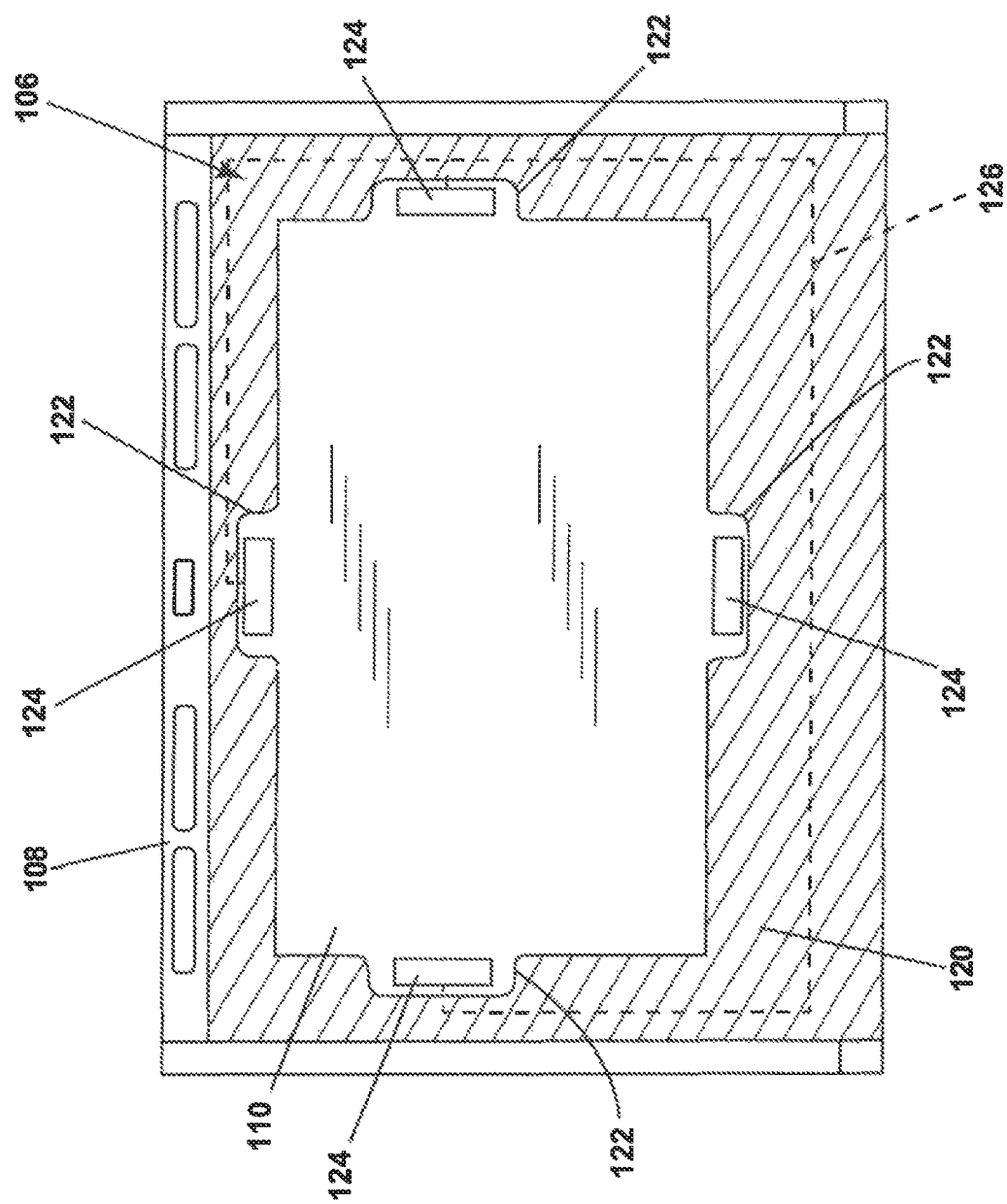
FIG. 8 is a front view of one part of the two-part door of FIG. 7.

FIG. 8 shows a front view of the inner frame 108, having the inner frame 108 removed for clarity. A set of lights 124 or illumination elements can be provided on the inner frame 108 at the gaps 122. The lights 124 can be used to backlight-illuminate the display 112 of the outer glass 98 and the transparent touch screen 94, without passing the light through the inner glass 110. More specifically, the light emitted from the lights 124 can be used to backlight the display 112 without passing through the inner glass 110, which can be come dirty through use of the oven, which may obscure the display 112. Electrical connections 126 can be provided on the inner frame 108 along the mask 120 to hide the electrical connections 126 from view when the door 106 is in the opened position. The electrical connections 126 can also be used to electrically and communicatively couple the display 112 and user interface 114 of the inner frame 108 to the remainder of the oven 100.

Figure 9:
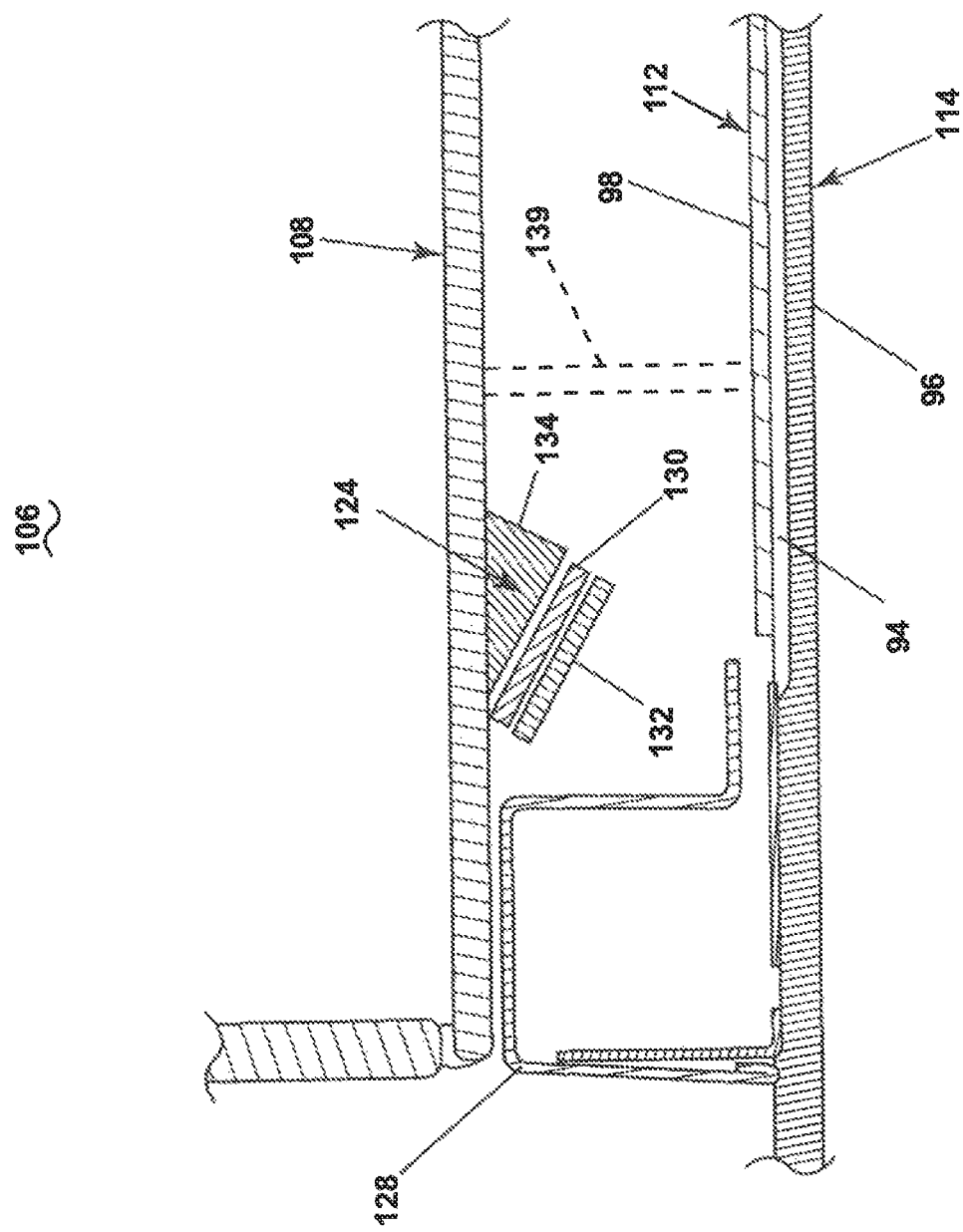
FIG. 9 is a section view of the two-part door of FIG. 7 including an internal door light for lighting the user interface.

FIG. 9 shows a section view of the door 106, having the inner frame 108 coupled to the outer frame 96 with a mount 128. One light 124 is visible coupled to the inner frame 108. The light 124 can further include a light module 130, such as a light emitting diode (LED) or other suitable light source. Additionally, the light 124 can include a heat sink 132 and a lens 134. The light 124 can be used to illuminate the display 112 and the user interface 114, without excessively lighting the interior of the remainder of the oven 100. In this way, the lights 124 can suitably illuminate the transparent, touchscreen display 112, while reducing or minimizing visual impairment of the display 112 cause by items within the interior 118 of the oven 100 or dirt provided on the inner glass 110. Furthermore, it is contemplated that a vacuum can be created between the inner frame 108 and the outer frame 96. Such a vacuum can provide for minimizing heat transfer to the display 112.

In another example, there can be frosting provided on the inner glass 110. The frosting can provide for minimizing light passed to the interior of the oven 100, while sufficiently backlighting the display 112. Alternatively, it is contemplated that the display 112 can be a transparent, touchscreen display having transparent LEDs or OLEDs, which can provide for direct illumination of the display 112, without requiring suitable backlighting illumination.

In yet another example, an optional light diffuser 139, shown in dashed line, can be provided between the inner frame 108 and the outer frame 96. The light diffuser 139 can provide for diffusing light from the light 124 to the display 112. Additionally, the light diffuser 139 can provide for hiding the light from view from a user through the transparent, touchscreen display 112.

Figure 10:
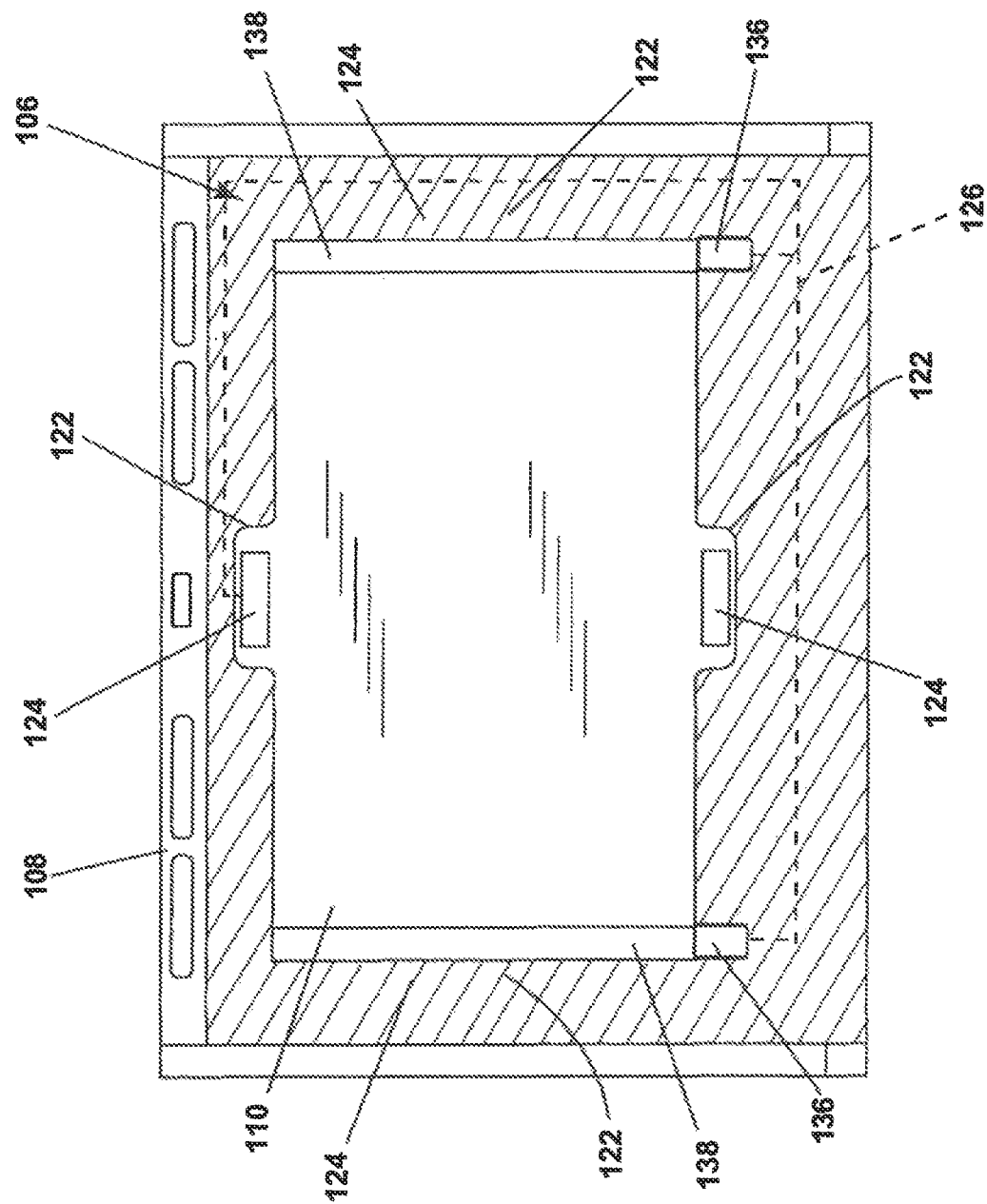
FIG. 10 is a front view of an alternative part of the two-part door of FIG. 7.

FIG. 10 shows an alternative arrangement for the light arrangement within the inner frame 108, and is looking at the front side of the inner frame 108, opposite the side facing the interior of the oven. FIG. 10 can be substantially similar to FIG. 8, and therefore the same numerals will be used to describe the same elements, and the discussion will be limited to the differences between the two. A set of LEDs 136, shown as two LEDs 136, can be provided behind the mask 120, such that the mask 120 separates the LEDs from directly lighting the interior of the oven, but rather illuminates the door. A light guide 138 can be connected to the LEDs 136 for spreading light around the door 106 to backlight illuminate the display 112. The light guides 138 provide for consistently illuminating the display from the LEDs 136 hidden behind the mask 120, while minimally lighting the interior of the oven.

Figure 11:
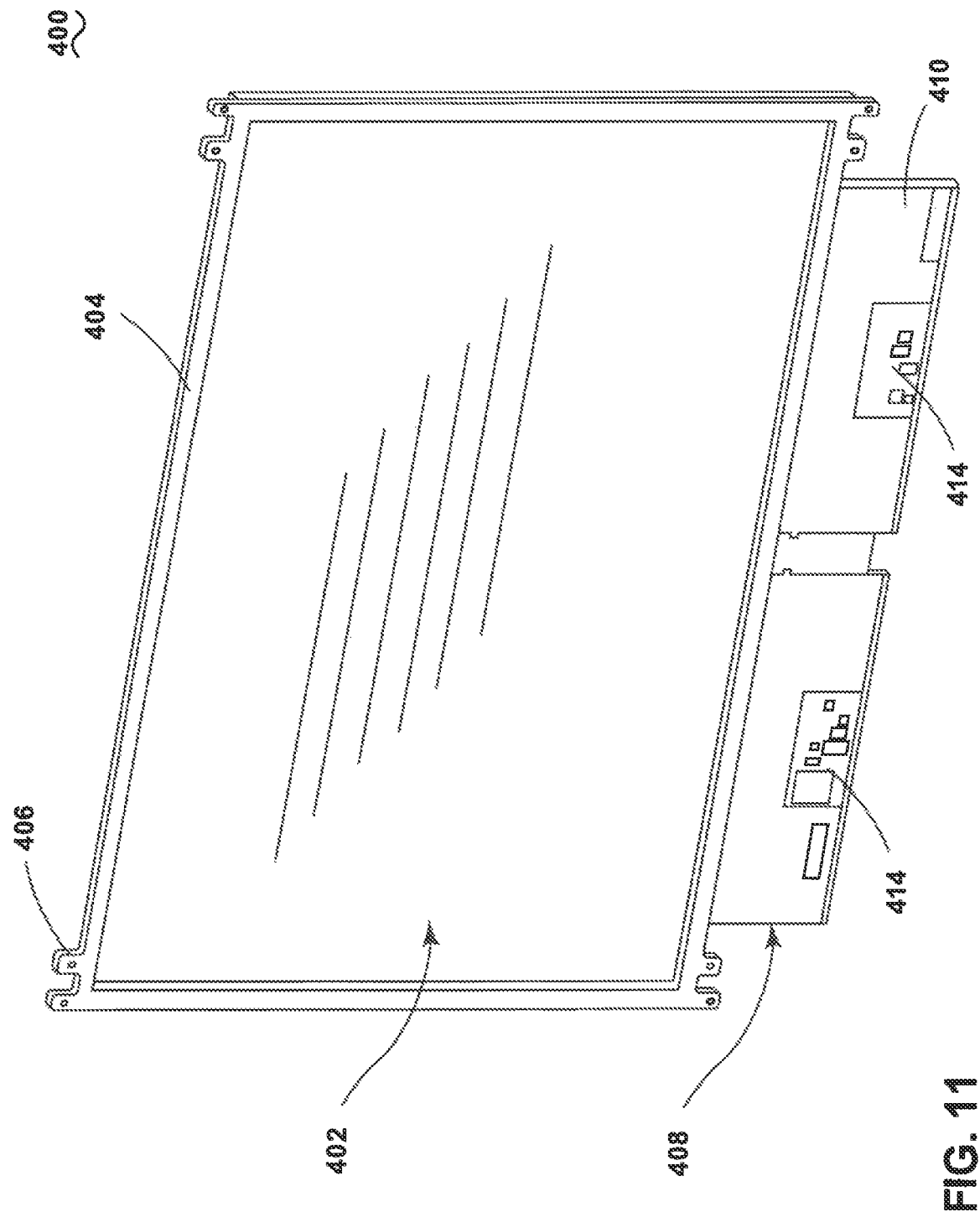
FIG. 11 is a front view of a door display component for use with a door for an oven, for selectively displaying a user interface or the interior of the oven.

FIG. 11 shows an exemplary display assembly 400, which can be used as the display in any appliance, oven, door, or other suitable display item or any item described herein which can utilize a display. The display assembly 400 can include a display 402 for displaying a desired image, color, opacity, or combination thereof. For example, the display 402 could depict a recipe or a food item requested by a user. In another example, the display 402 could be completely transparent, permitting a user to view the interior of the appliance. Thus, it should be appreciated that the display 402 can provide for displaying any information, or lack thereof, and can be completely or partially transparent. The display 402 can also locally or discretely change what is displayed, and need not be common among the entirety of the display 402.

The display 402 can be contained within a frame 404. The frame 404 can be used to hold the display 402, as well as mount the display 402 to the remainder of the door or appliance to which it attaches. The frame 404 can includes a set of extensions 406 having fastener openings 408 for mounting the frame 404 to a door or appliance, for example.

A connection assembly 408 can extend from a portion of the frame 404. The connection assembly 408 can include a housing 410, which can contain a printed circuit board (PCB) 414 as well as other electrical components. The PCB 414 can be operably coupled to the display 402, providing for controlling operation of the display 402. The PCB 414 can also provide for electrically and communicatively connecting the display assembly 400 to the rest of the appliance within which the display assembly 400 is mounted.

Figure 12:
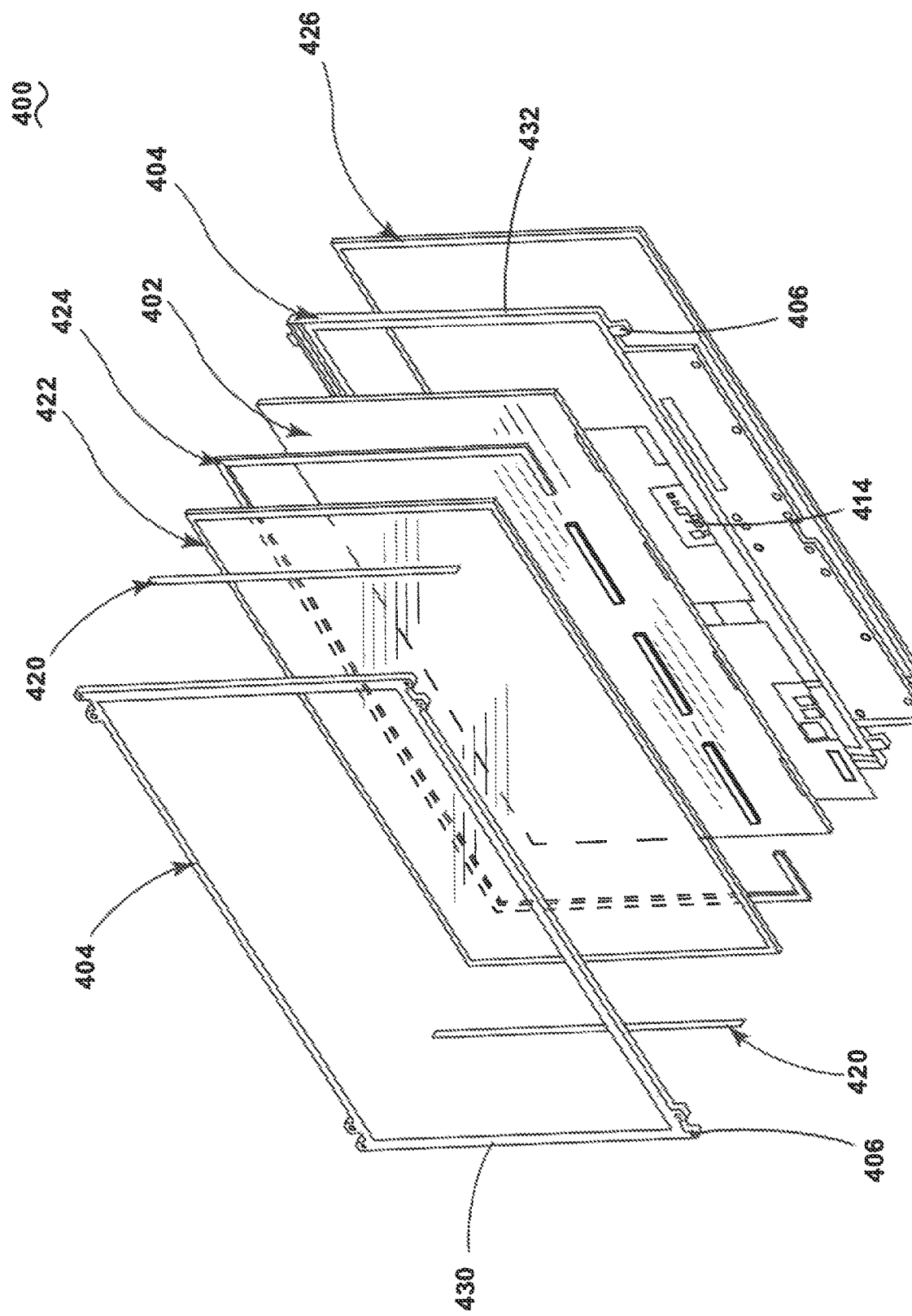
FIG. 12 is an exploded view of the door display component of FIG. 11.

FIG. 12 shows an exploded view of the display assembly 400, better illustrating the additional components included within the assembly 400. The display assembly 400 includes the display 402 as well as the frame 404, but also can include a light source 420, light glass 422, a first gasket assembly 424, and a second gasket assembly 426.

The frame 404 can be separated into a frame cover 430 and a frame base 432, which can collectively adjoin to form the frame 404, and contain the light source 420, the light glass 422, the first gasket 424, and the display 402. In one example, one or more of the extensions 406 can be used to fasten the frame cover 430 to the frame base 432 with one or more fasteners. The frame 404, as well as the frame cover 430 and the frame base 432, can be made of a material capable of withstanding high temperatures, such as those more than 110 degrees Fahrenheit. Suitable materials can include thermally resistant plastic or Aluminum, while a number of materials would be suitable.

The light source 420 can be any suitable light source for illuminating the light glass 422 and the display 402. In one example, the light source 420 can be provided as a pair of light emitting diode (LED) sources, formed as strips. In another example, the light source 420 can be formed as an LED source provided on an Aluminum substrate. The light sources 420 are shown as provided on the sides of the light glass 422 and the display 402, while any suitable positioning is contemplated. Ideally, the positioning and light source 420 is one that suitably lights the display 402, without providing excessive backlighting, or preventing or hindering transparency of the display 402 when desired. It should be also appreciated that the LED orientation and placement can have an impact on display quality of the display 402. Therefore, while the exploded view shows that the light sources 420 are provided as a pair of LEDs on strips, it is also contemplated that the light sources 420 can be arranged on any one or more of either lateral side, the top, the bottom, or any combination thereof. Additionally, the LEDs can have a power between 1200 lumen to 3600 lumen, while other powers are contemplated.

The light sources 420 can be electrically and operably coupled to the PCB 414 for powering and controlling operation of the light sources 420. For example, electrical connections can connect the light sources 420 to the PCB 414, which can be hidden within the frame 404 when the assembly is completed. The PCB 414 or components thereof can control the power provided to one or more of the light sources 420, which can be varied to change the level of transparency or opacity for the display 402.

The light glass 422 provides for backlighting the display 402 with the light source 420. The light glass 422 can be thin, having a thickness between two millimeters (mm) and six mm. It should be appreciated that greater or lesser thicknesses may be used, but can have an impact on display quality the further the thickness varies from between two mm to six mm. For example, variation from the 2 mm-6 mm range may have a negative impact on the transparency or display quality for the display assembly 400.

The first gasket assembly 424 can be provided between the light glass 422 and the display 402. The first gasket assembly 424 is formed as a combination of individual gaskets, providing space for portions of the connection assembly 408 mounted to the display 402. The first gasket assembly 424 provides for sealing the spaced between the display 402 and the light glass 422, preventing dust or other matter from entering between the two, which could otherwise distort or tarnish the display 402.

Figure 13:
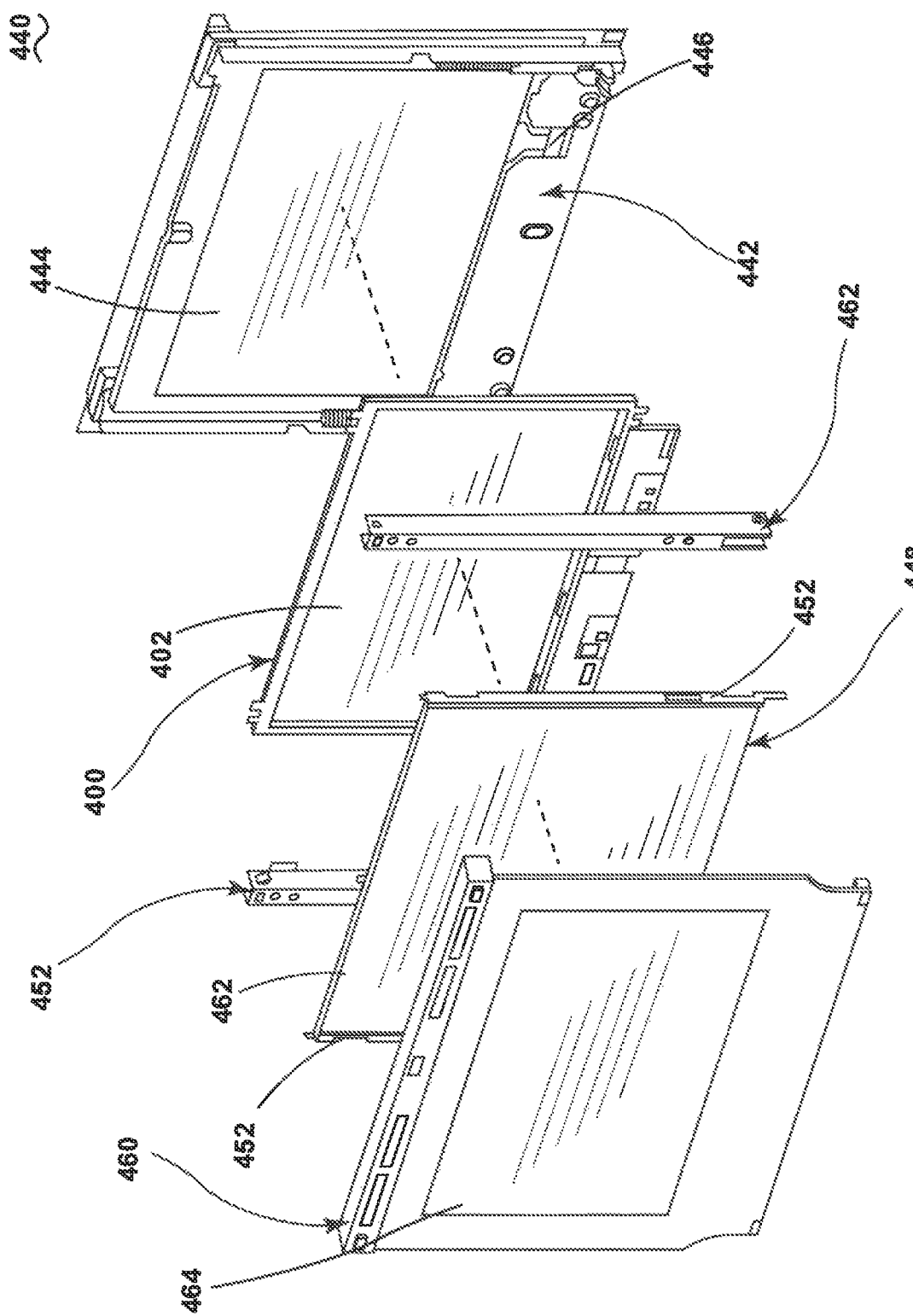
FIG. 13 is an exploded view of a door assembly incorporating the door display component of FIGS. 11 and 12.

The second gasket assembly 426 can be provided between the frame 402 and a touch panel 444 (not shown in FIG. 12, see FIG. 13). The second gasket assembly 426 can serve a purpose similar to that of the first gasket assembly 424, except that the second gasket assembly 426 seals the opposite side of the display 402 which is adjacent the touch panel 444.

FIG. 13 shows an exploded view of a door assembly 440, incorporating the display assembly 400 of FIGS. 11-12. The door assembly 440 includes a front door structure 442 that can include a touch panel 444 forming the front glass of the door structure 442. Additionally, one or more components can be included with the front door structure 442. While only a PCB 446 is shown, any suitable controller can be utilized to transmit information from the touch panel 444 to the remainder of the door assembly 440. The display assembly 400 can couple to the front door structure 442, such that the touch panel 444 is provided in front of the display 402, such that the user can interact with the display 402 via touching the touch panel 444, while not directly interacting with the display 402. In this way, the display 402 can be protected to resist or minimize potential damage, as well as improve overall lifetime.

The door assembly 440 further includes a thermal cover assembly 448, which can include a thermal glass 450 mounted between a pair of frame rails 452. The thermal cover assembly 448 can be transparent, permitting viewing into the interior of the appliance to which the door assembly 440 mounts. The thermal cover assembly 448 provides at least some thermal protection for the display assembly 400, such that heightened temperatures do not negatively impact operation of the display assembly 400, and that the touch panel 444 does not excessively heat.

An inner glass door assembly 460 is provided at the interior-most portion of the door assembly 440, relative to an interior of the appliance upon which the door assembly 400 is mounted. The inner glass assembly 460 is the first shield against the heated environment interior of the appliance, and should be made of a material capable of withstanding heightened temperatures, such as those during operation of an oven, for example.

A pair of rail covers 462 are provided for securing the door assembly 440 together at the sides. Additionally, a top rail 464 can be provided with the inner glass door assembly 460, which can be used to secure and cover the door assembly 440 at the top and adjoin to the rail covers 462.

The door assembly 440, as well as the display assembly 400 contained therein, provides for a touch-enabled door assembly with a display, permitting the user to interact with the appliance to which the door assembly 440 attaches. Additionally, the display assembly 400 provides for a determinative transparency or opacity for the display 402, permitting the user to view the user interface on the display 402, or view the interior of the appliance through the display 402. Additionally, the door assembly 440 provides for integrating the user interface into the door of the appliance, while utilizing a user interface that can be selectively shown or transparent on the door. Furthermore, the door assembly 440 including the thermal glass 450 provides for suitable temperature distribution to prevent overheating or damage of the display assembly 400.

Figure 14:
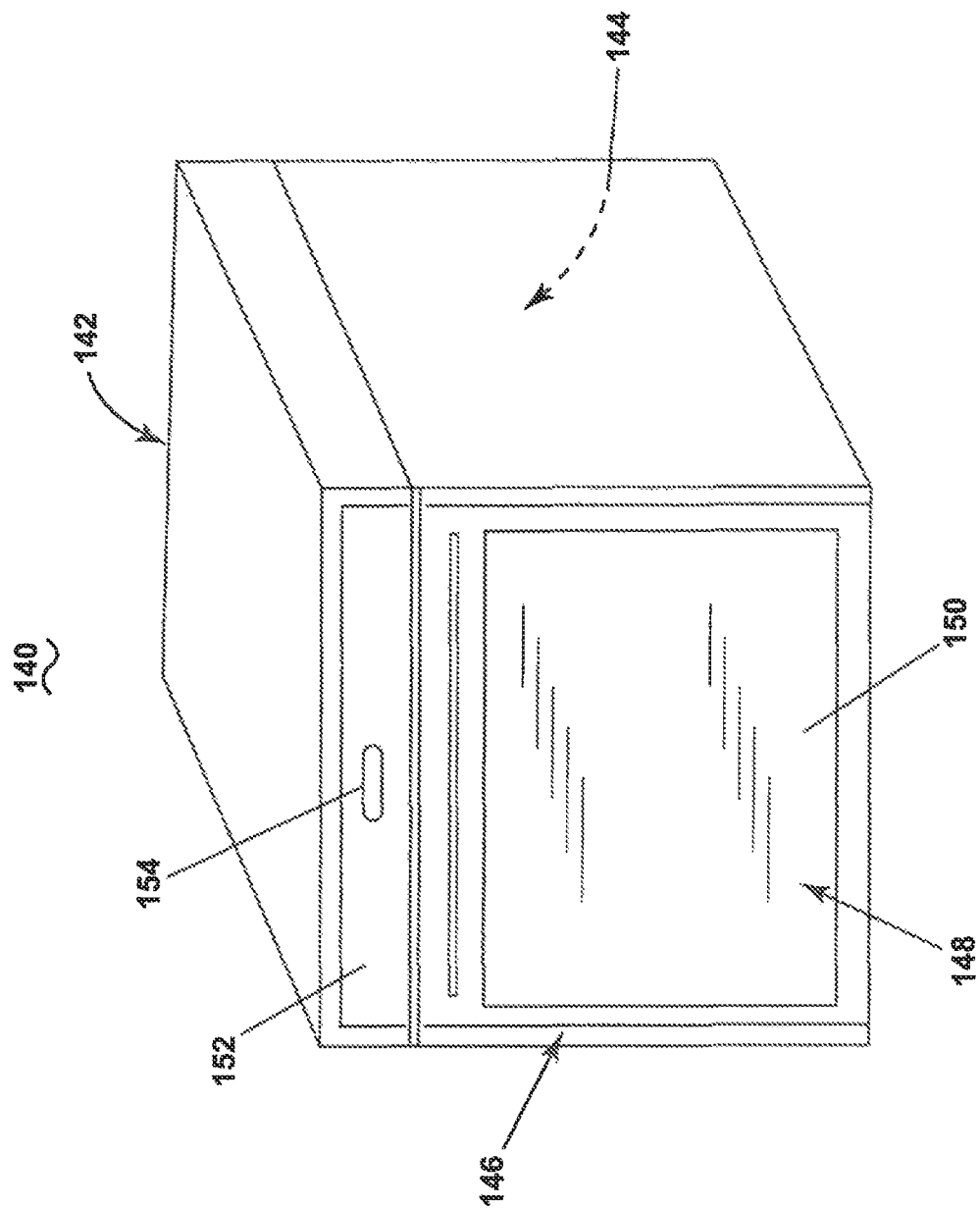
FIG. 14 is a front view of another oven with a transparent, touchscreen user interface with a camera on a front panel of the oven.

FIG. 14 shows a front perspective view of another exemplary oven 140. The oven 140 includes a chassis 142 to define an interior 144. A door 146 can move between an opened position and a closed position, as shown, selectively opening and closing the interior 144. The door 146 further includes a display 148 with a transparent, touchscreen user interface 150. The chassis 142 further includes an upper panel 152 positioned above the door 146.

A camera 154 is provided on the upper panel 152 and faces outwardly towards a user using the user interface 150. The camera 154 can be used by the user to interact with the oven 140 and the user interface 150, as well as facilitating use of the user interface 150. In this way, the camera 154 can complement use of the transparent, touchscreen display 148. While the camera 154 is shown on the upper panel 152, other positions are contemplated for the upper panel 152. Non-limiting examples can include the bottom of the user interface, or below the handle on the door.

Figure 15:
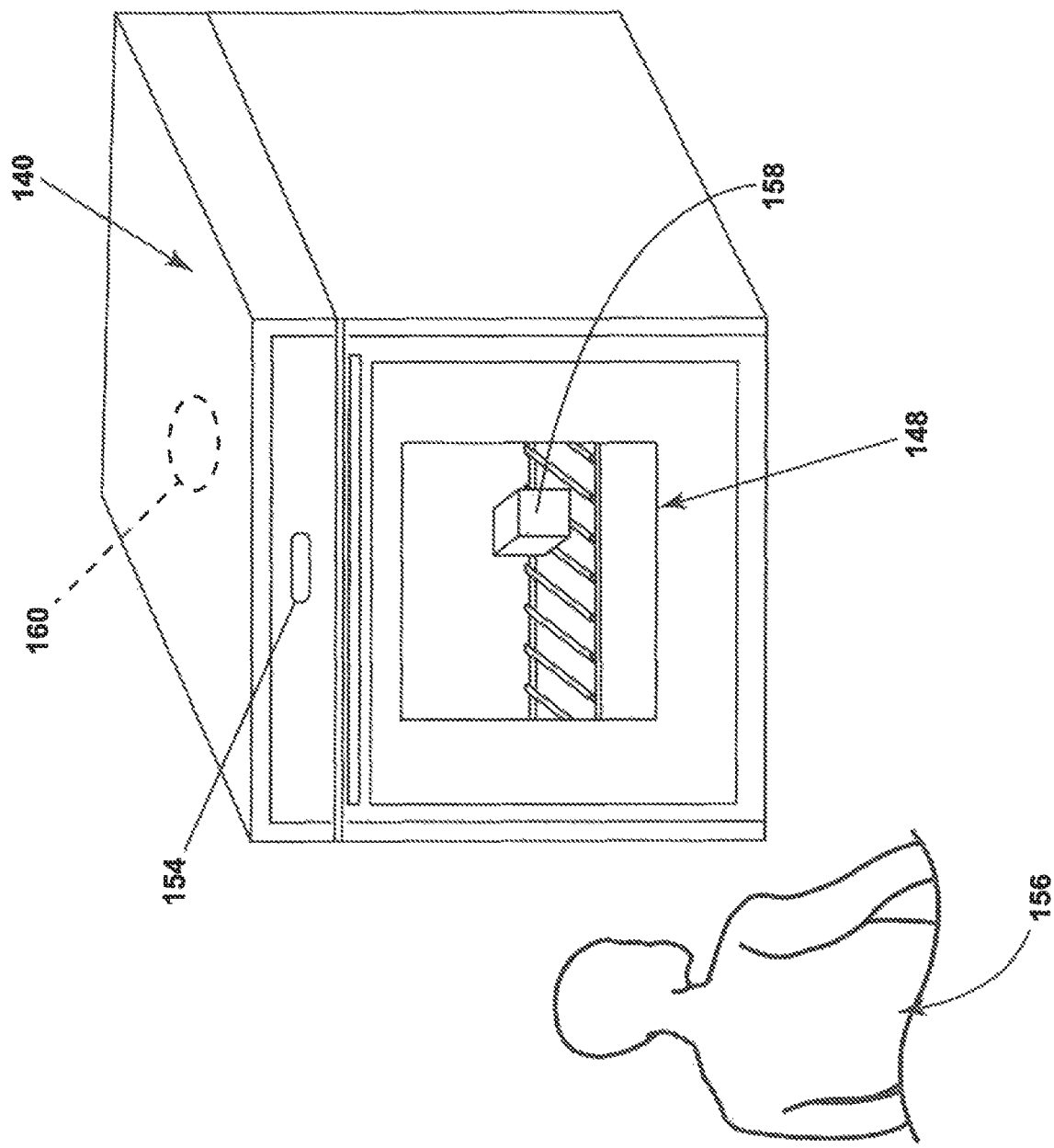
FIG. 15 is a front view of a user and the oven of FIG. 14 illustrating a first position of a food item within the oven on the user interface based upon a position of the user.

FIG. 15 includes a user 156 viewing the oven 140, and the camera 154 can sense, record, or otherwise image the user viewing the over 140. Additionally, a separate camera 160 can be provided on the oven 140 for imaging the interior of the oven 140, such as imaging a food item contained therein. The user interface 150 depicts a food item 158 contained within the oven 140. It should be appreciated that the food item 158 is both contained in the oven 140, at least partially hidden from view through the transparent, touchscreen display 148, and displayed as an image on the display 148. The image of the food item 158 can be a three-dimensional representation of an actual food item, imaged by the camera 160 viewing the interior of the oven 140. In one example, the camera 160 can identify the food item contained within the oven 140, generating its own three-dimensional image of the food item. Alternatively, it is contemplated that the user can input the particular food item, which can be provided to the oven 140, such as from a database. Using the identification of the food item within the oven, the display 148 can generate an image of the food item.

As the user 156 is positioned on the left side of the oven 140, the camera 154 on the upper panel 152 can take an image and record a position of the user 156. The image of the food item 158 presented on the display 148 can be shown from the left side, as imaged by the interior camera 160, reflecting the proper vantage for the user for a virtual representation of the food item 158.

Figure 16:
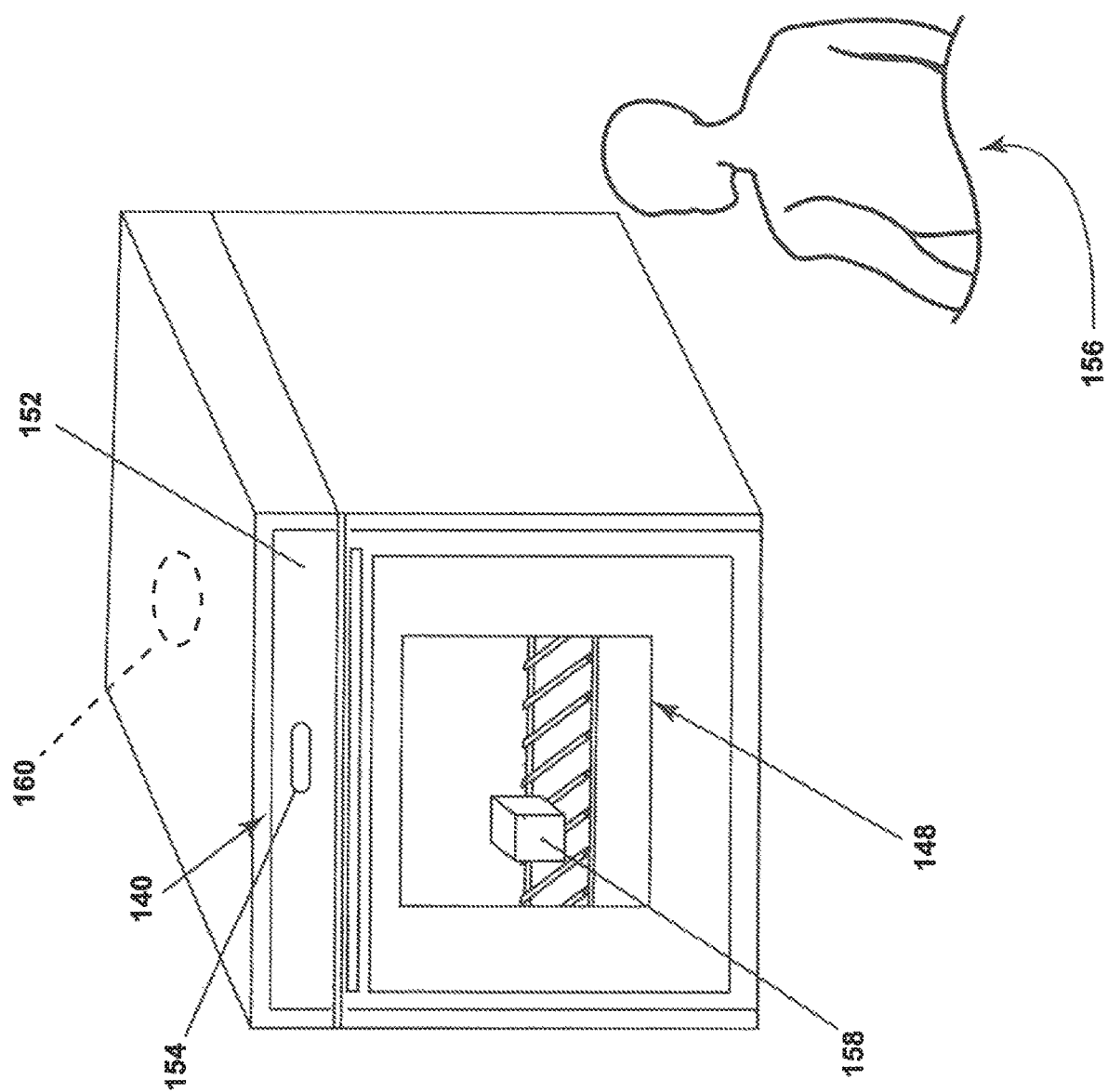
FIG. 16 is another front view of the user and oven of FIG. 14, with the food item illustrated on the user interface from an alternative perspective, adjusting for parallax based upon position of the user.

Referring now to FIG. 16, the user 156 is now moved to the right side of the oven 140. The changed position of the user 156 can be measured and recorded by the camera 154 on the upper panel 152. Based upon the right-side position of the user 156, the three-dimensional representation of the food item 158 has now been virtually rotated to properly reflect the vantage point of the user 156, which can be recorded and generated by the camera 160 viewing the interior of the oven 140.

Therefore, it should be appreciated that the camera 154 on the upper panel 152 can be used to determine a local position of the user 156 relative to the oven 140. Such a measurement can be used to record a food item within the oven 140 and generate a three-dimensional representation on the display 148 reflective of the position of the user 156. In this way, the image provided on the display 148 can provide for the user viewing the food item within the oven 140, which may otherwise become obscured by the transparent, touchscreen display 148. Furthermore, it should be appreciated that the generated image of the food item 158 can be rotatable as a three-dimensional representation, based upon position or movement of the user to adjust for the parallax imaging of the food item within the oven 140. Such an image recorded by the camera 160 and provided to the display 148 can be done in real time based upon movement and location of the user recorded by the camera 154. Additionally, the user need not change the position of where they are standing, but the camera 154 can detect a user's eyes or face and can rotate the image of the food item based upon head or eye movement of the user alone. Facial recognition software or eye tracking software can be used by the camera 154 to adjust for the parallax imaging of the food item in real time.

In one example, the camera 154 can focus on the user's eyes to track the position of the user 156. More specifically, the camera 154 can include or be operably coupled to a processor including an eye-tracking algorithm to identify and track the position of the user's eyes via the camera 154. As the user 156 moves, the camera 154 can track the position of the user 156 based upon the movement of the user's eyes. As the user moves laterally or side-to-side, the camera 154 can track the user's eyes and rotate the displayed image of the food item 158 to adjust for parallax of the image based upon the position of the user 156. In another example, the camera 154 can use facial recognition software to determine the position and distance of the user from the oven 140. Generally, it should be appreciated that the camera 154 can be used to record or image a user, and software in the controller can utilize the image to real-time determine the position and movement of the user.

Figure 17:
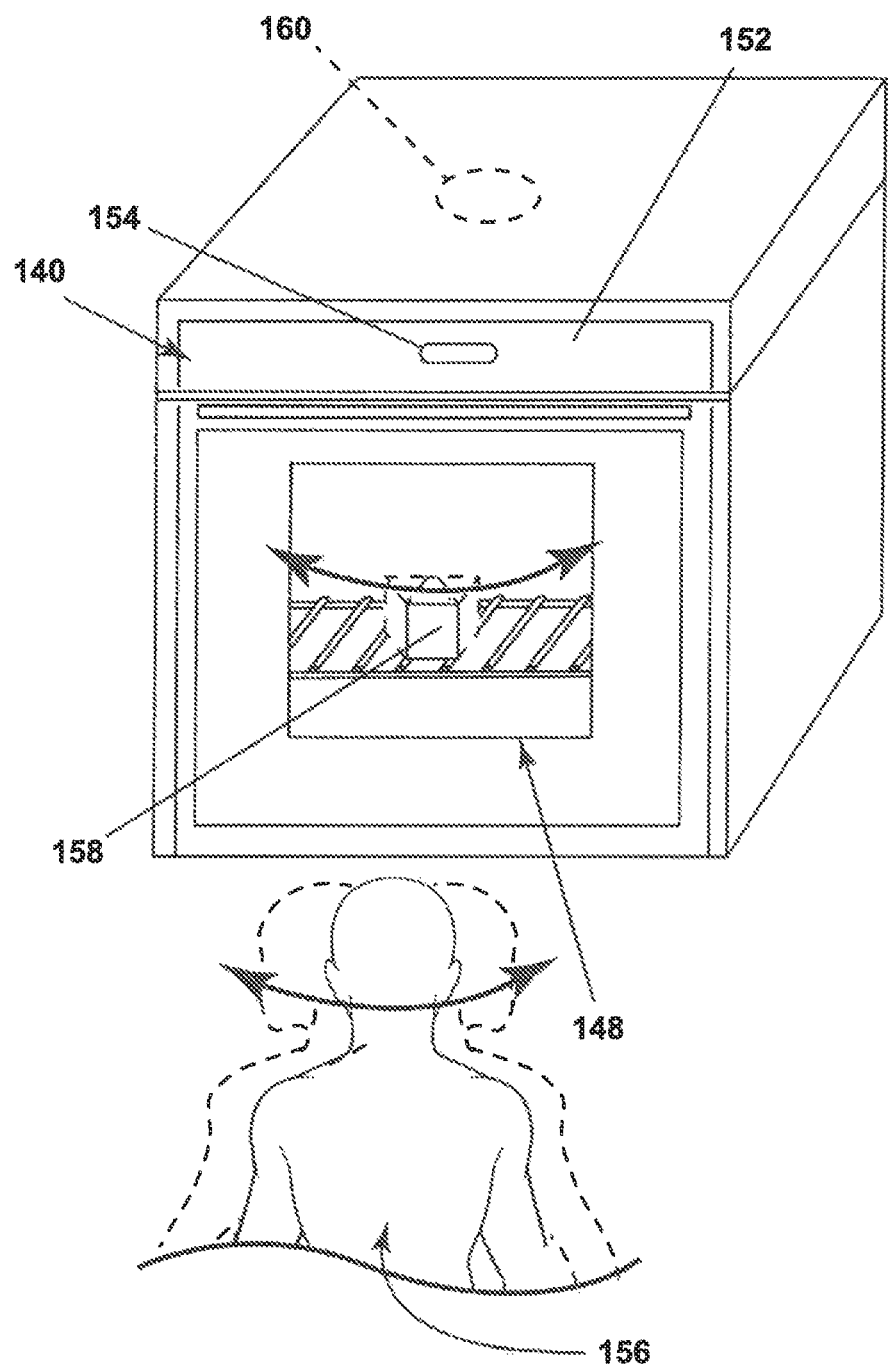
FIG. 17 is another front view of a user that moves laterally to view a food item in the oven of FIG. 14 and the parallax adjustment for the food item on the user interface based upon the user position.

Referring now to FIG. 17, an alternative representation for the parallax compensation for the oven 140 is shown, to facilitate understanding of the concept. As the user 156 moves left or right, depicted by arrows and broken lines for the user 156, the front camera 154 can record and image the movement of the user 156. The oven 140 can provide for displaying the food item 158 in a rotated, three-dimensional position, based upon the position of the user, to adjust for parallax. In this way, the user 156 is permitted to view the sides of the food item 158 as well, and inspect how the cooking process is going without opening the oven 140 to inspect the food item 158.

It should be appreciated that the image of the food item 158 can be adjusted based upon the position of the user. For example, the lateral position of the user moving side-to-side or left-to-right can rotate, move, or augment the image of the food item 158 so the user can inspect different portions of the food item based upon the movement of the user as measured by the camera 154. In another example, the image of the food item 158 can be sized based upon a distance of the user from the oven 140 as measured by the camera 154. As the user moves closer to the oven 140, the image can be enlarged to facilitate inspection of the food item 158, while the food item can become smaller or shrink as the user moves away from the oven 140.

Figure 18:
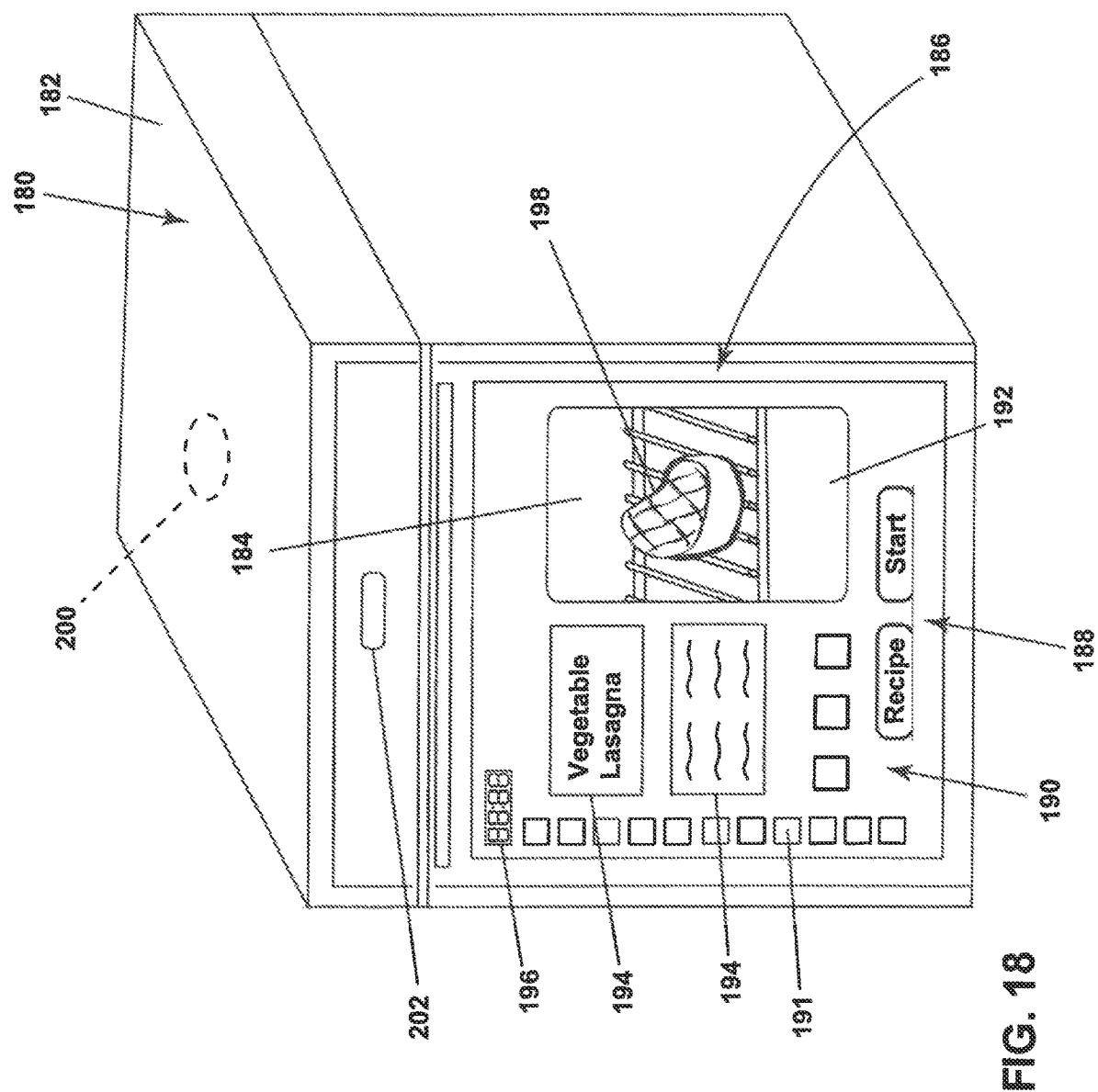
FIG. 18 is a front view of another oven with a transparent, touchscreen user interface with a depiction of a food item within the oven presented on the user interface in a first position.

Referring to FIG. 18, another exemplary oven 180 includes a chassis 182 defining an interior 184. A door 186 is movable between and opened position and a closed position, as shown, selectively providing access to the interior 184. A transparent, touchscreen display user interface 188 is provided on the door 186, with the user interface 188 permitting a user to interact with and operate the oven 180.

The user interface 188 can include a control portion 190 and a viewing portion 192. The control portion 190 can include one or more elements facilitating interaction with and control of the oven 180. Exemplary elements can include touch buttons 191, an information pane 194, a timer 196, as well as other operation controls for the oven 180. The viewing portion 192 can provide for viewing a food item 198 within the oven 180. In one example, the viewing portion 192 can be transparent, permitting viewing of the food item 198 within the oven 180 via the transparent display user interface 188. Alternatively, the viewing portion 192 can generate an image of the food item 198, as recorded by an interior camera 200 imaging the food item 198. Furthermore, it is contemplated that the user interface 188 can show a time-lapsed video of the food, or as a series of images, to illustrate how the food has changed over time as it is cooked.

Figure 19:
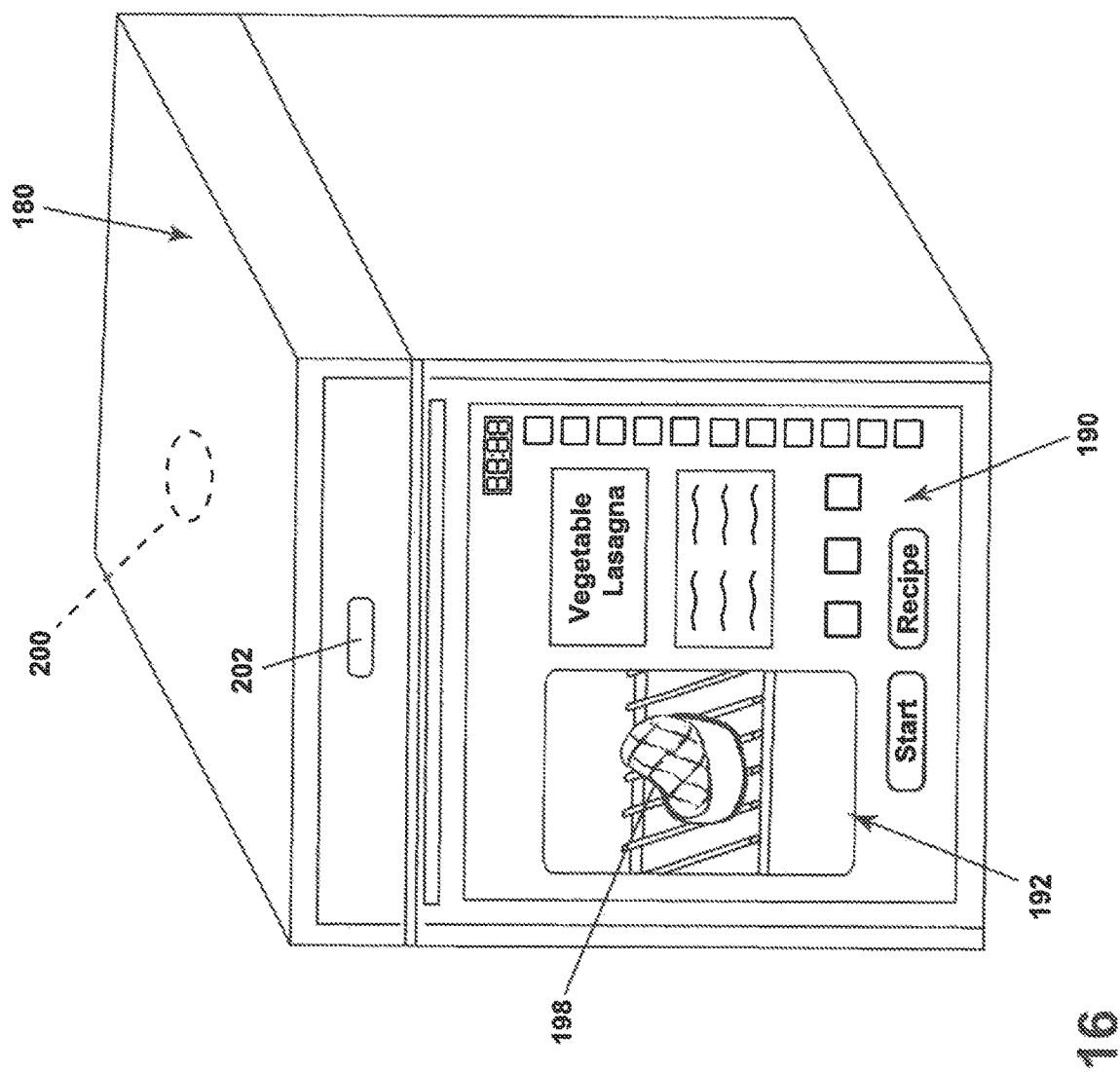
FIG. 19 is a front view of the oven of FIG. 18 with the food item presented on a different portion of the user interface.

Referring to FIG. 19, the positions of the control portion 190 and the viewing portion 192 have been switched as compared with that of FIG. 18. The switched position of the portions 190, 192 provides for viewing the food item 198 from an alternative position. Such a position for the control portion 190 and the viewing portion 192 can be determined, for example, by a position of a user. The position of the user can be measured by a second camera 202 provided on the front of the oven 180. The oven 180 can vary the position of the control portion 190 and the viewing portion 192, based upon the position of the user to facilitate viewing of the food item 198. Furthermore, the image of the food item 198 presented on the viewing portion 192 can be rotatable, similar to that described in FIGS. 15-16, adjusting for the parallax as the user views the food item 198 being represented in the differing positions of the viewing portion 192.

Figure 20:
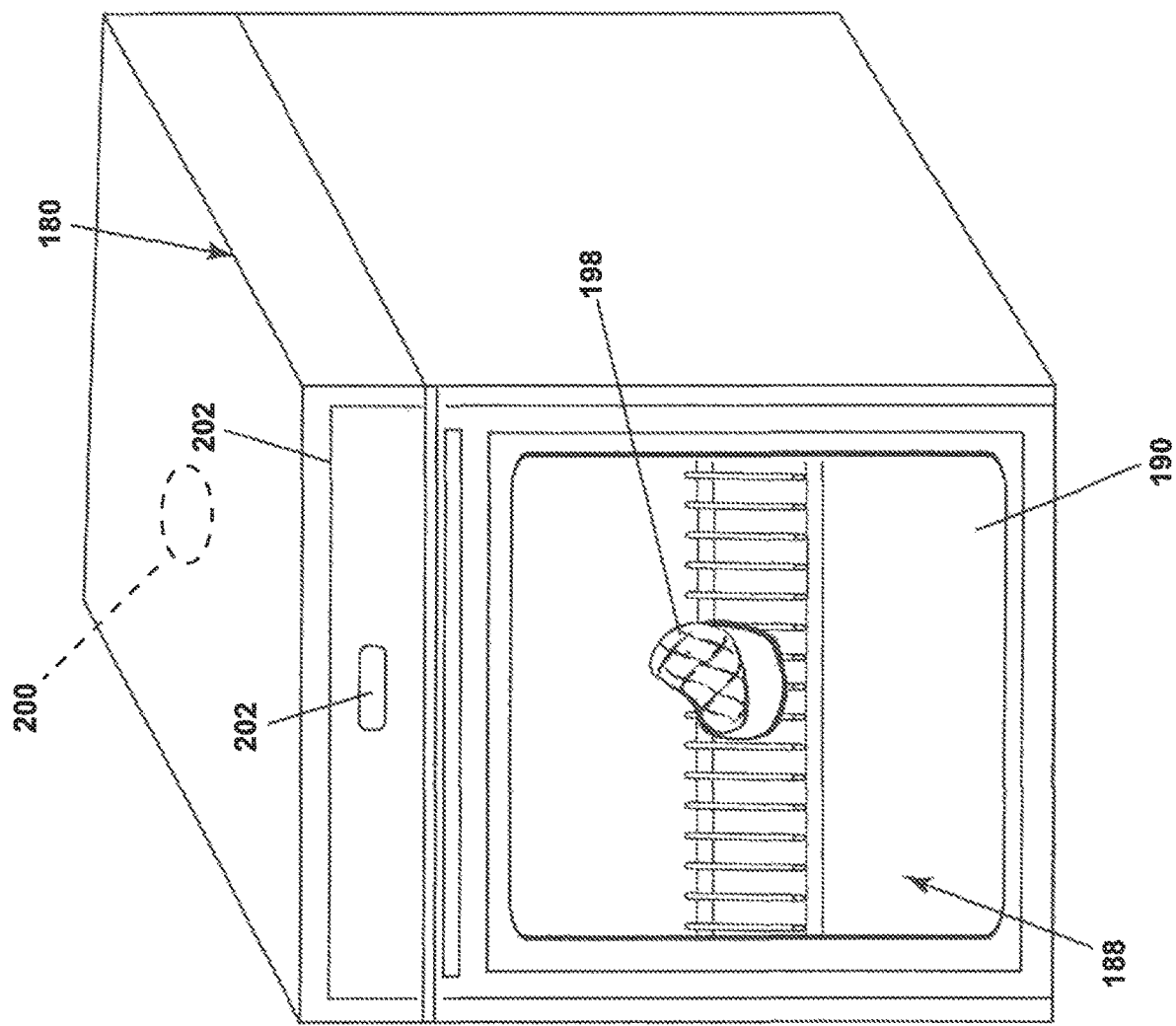
FIG. 20 is a front view of the oven of FIG. 18 showing an enlarged transparent portion for the user interface.

Referring to FIG. 20 shows the oven 180 with the user interface 188 as fully or near-fully transparent, providing for viewing the food item 198 within the interior of the oven 180 through the user interface 188. Alternatively, it is contemplated that the user interface 188 can be fully covering the display on the door 186, displaying a virtual reality or augmented reality image of the food item 198 on the full user interface 188.

Figure 21:
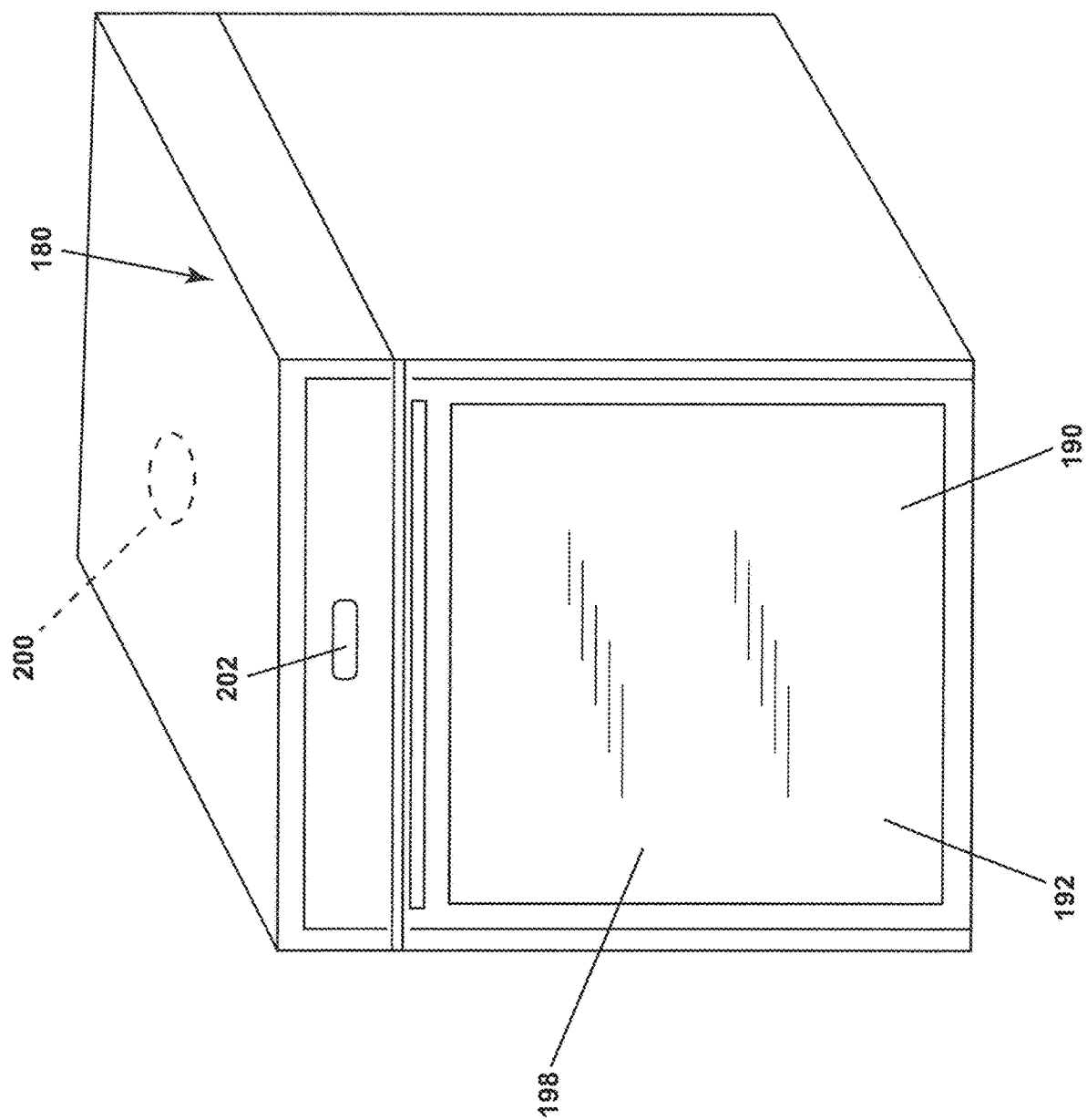
FIG. 21 is a front view of the oven of FIG. 18 with an opaque user interface.

Referring to FIG. 21, the user interface 188 on the oven 180 can be wholly opaque, as controlled by the user interface 188. The opaque user interface 188 can hide the interior of the oven 180, providing for an appealing user aesthetic when the oven is not in use or in the middle of operation when inspection by the user is not needed. In one example, the camera 202 can be used to detect the user having a distance from the oven 180. The opacity for the user interface 188 can be adjusted based upon the distance of the user as measured by the camera 202. For example, as the user moves nearer to the oven 180, the opacity can decrease. As the user moves further from the oven 180, the opacity can increase. Such a variable opacity can provide for a desirable aesthetic while the user is not interacting with the oven 180, but can activate as the user nears the oven 180, enabling interaction with the oven 180 as the user approaches the oven 180. As the user nears the oven 180 and the opacity decreases, the transparent portion of the user interface can provide a view of the interior of the oven 180, or the control portion of the user interface can become visible, such as those described in FIGS. 18 and 19.

Regarding FIGS. 18-21, it should be appreciated that the user interface 188 provides for multiple operational modes for the oven 180. Specifically, an opaque mode, shown in FIG. 21, a transparent mode, shown in FIG. 20, and a mixed mode, shown in FIGS. 18 and 19, can be utilized by the oven 180 to provide a variable set of user experiences through variation with the user interface 188. The opaque mode can provide for hiding the interior and providing an aesthetic appearance when the oven 180 is not in use. The transparent mode can provide a transparent window for the entirety of the user interface 188, permitting a full view of the interior of the oven, or a full augmented reality view. Finally, the mixed mode can provide for presenting both a user interface 188 that the user can interact with to control the oven, as well as a transparent portion for viewing the interior of the oven 180. Furthermore, the user can arrange the user interfaced 188 in the mixed mode, such as with a drag-and-drop format, and can move particular items to facilitate use or viewing of the interior of the oven 180, such as that illustrated among FIGS. 18 and 19.

Figure 22:
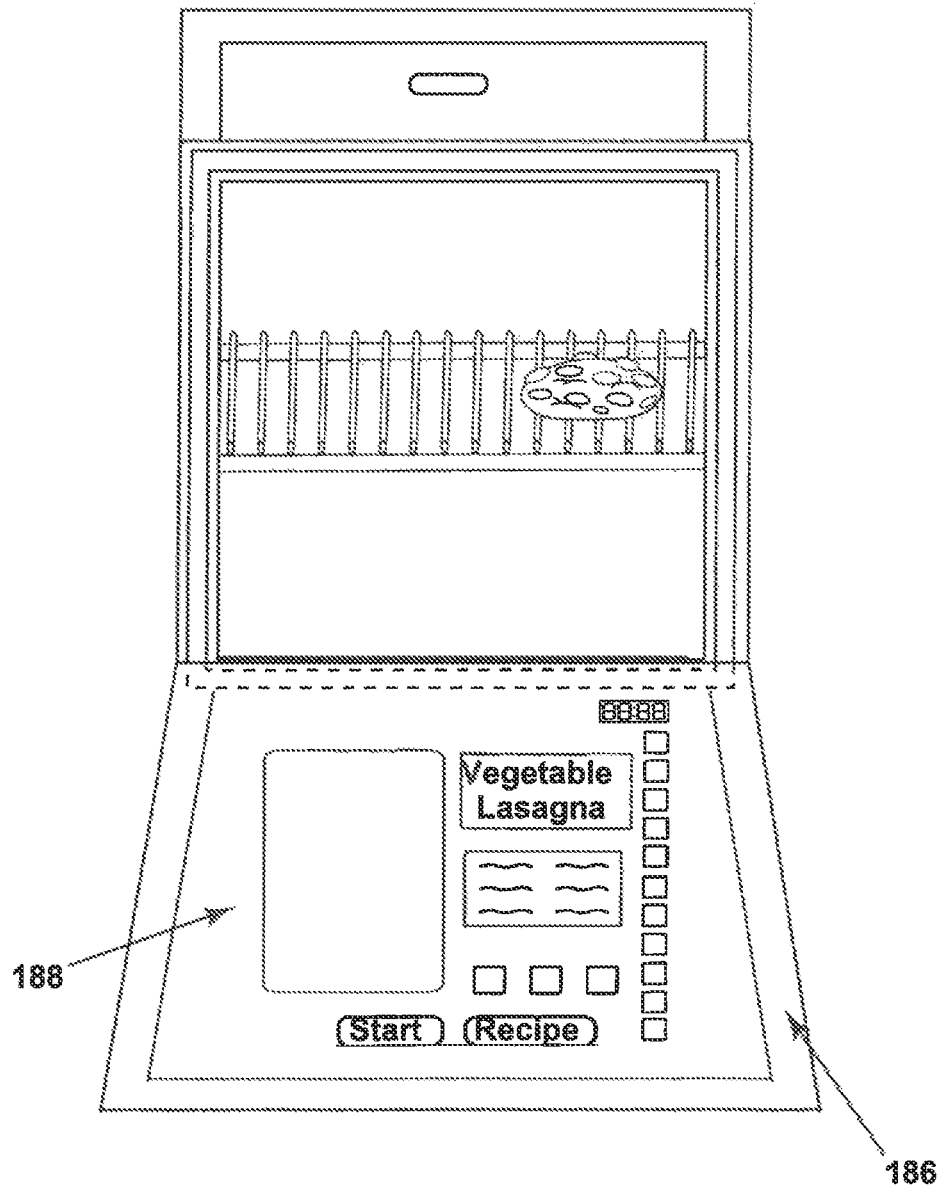
FIG. 22 is a front view of the oven of FIG. 18 with the door in an opened position showing a vertically flipped user interface.

Referring now to FIG. 22, oven 180 of FIGS. 18-21 is shown in the opened position, with the door 186 pivoted downward. The user interface 188 is visible through the transparent, touchscreen display. It should be appreciated that the user interface 188 can be flipped vertically. In this way, the user interface 188 that would be upside-down in the opened position is now oriented upright, permitting the user to view the user interface 188 when the door 186 is opened. It is further contemplated that it is possible to have a second touch surface permitting the user to interact with the user interface 188 in the opened position on the interior of the door 186.

Figure 23:
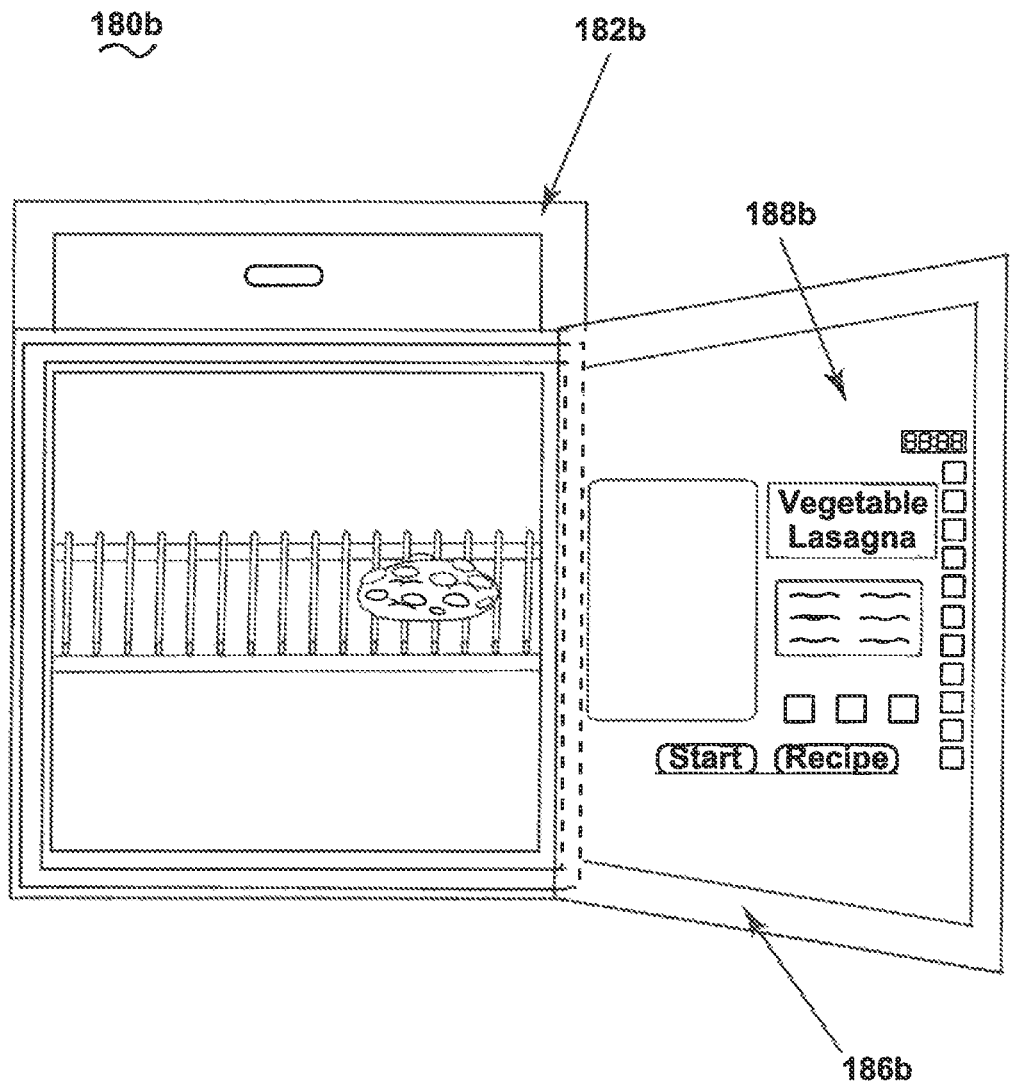
FIG. 23 is a front view of the oven of FIG. 18 with a sideways opening door, with a horizontally flipped user interface.

Referring now to FIG. 23, which can be substantially similar to FIG. 22, shows a door 186b in the opened position that can opened in a sideways or side-to-side manner, pivoting about the chassis 182b along a sidewall. The user interface 188b can be flipped horizontally, such that the user interacting with the oven 180b can properly view the information displayed on the user interface 188b through the transparent display. Additionally, it is contemplated that the door may have a second touch surface to interact with the door on the interior of the door 186b.

Figure 24:
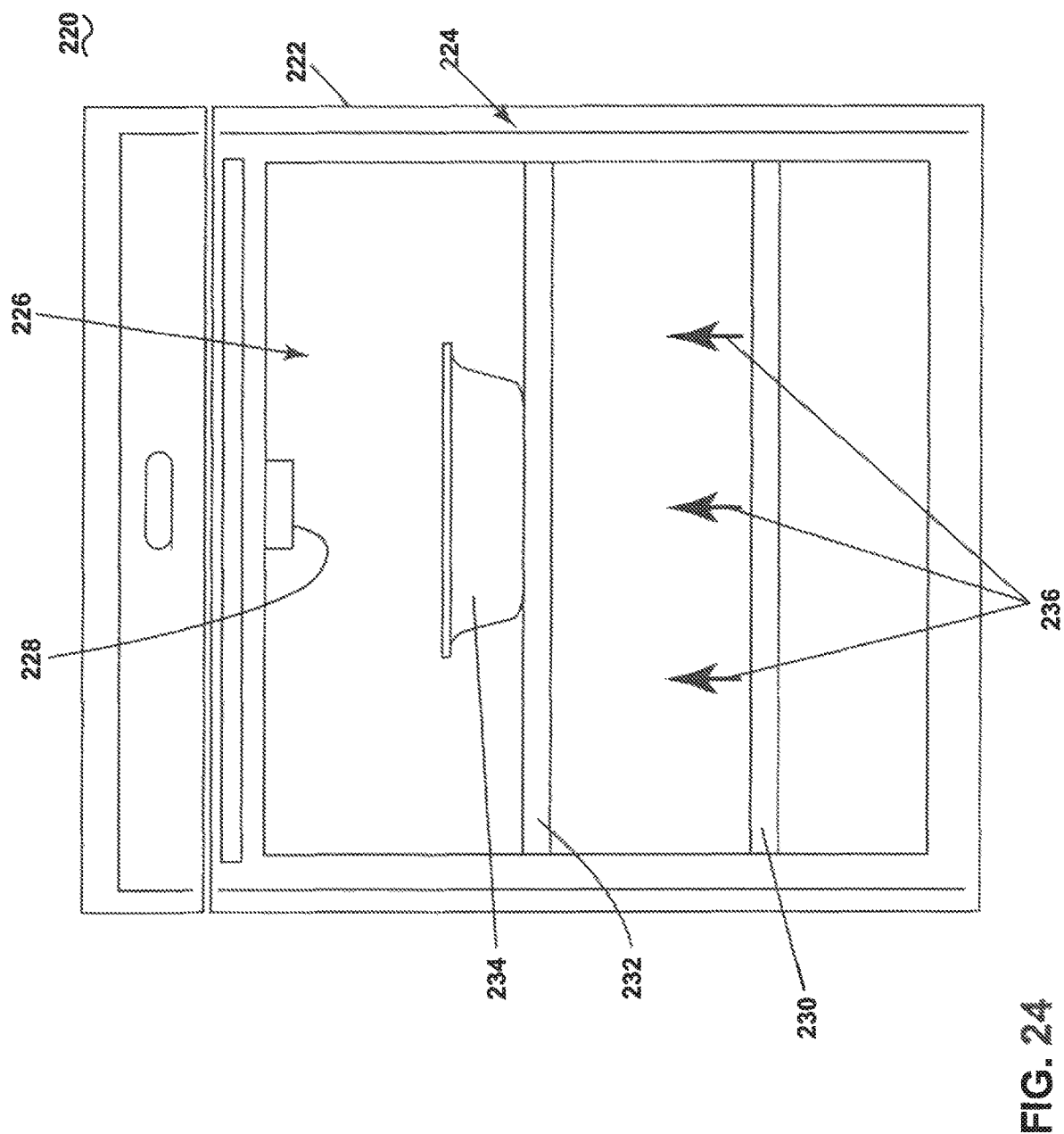
FIG. 24 is a front view of another oven with a transparent, touchscreen display illustrating a guide on where to place a rack in the oven.

Referring to FIG. 24, another exemplary oven 220 is shown including a chassis 222 with a door 224. A transparent, touchscreen display 226 is provided on the door 224 for viewing the interior of the oven 220 and interacting with and controlling the oven 220. A camera 228 can be provided on the chassis 222 for viewing and imaging the interior of the oven 220. The camera 228 can be used to determine a position of a rack 230 provided within the oven 220. The display 226 can display a representation of the rack 230 at the current position. Additionally, the display 226 can display a suggested position for the rack 232. Such a suggested position can be based on a current food item 234, such as a pie as shown. For example, a food item 234 provided to near or far from the center of the oven can provide or increased cooking near the center of the oven and decreased cooking further from the center of the oven, resulting in an uneven cook of the food item 234. In another example, a pie closer to the bottom of the oven will brown the bottom of the pie faster from the radiant heat, while a position closer to the top can brown the top faster. Where an optimal cooking position for the food item 234 is at a position different than that of the current position of the rack 230, the display 226 can present a virtual optimal position for cooking the item via the suggested position for the rack 232, depicted with virtual arrows 236 suggesting moving the rack to another position. Additionally, it is contemplated that a position of the food item at the correct height can be displayed on the display 226, and the user can adjust the height of the rack to arrange the food item 234 at the correct height based upon the image on the display 226. Therefore, the transparent, touchscreen display 226 can work in concert with the camera 228 to determine the current position and suggest another position for a rack 230. In this way, the oven 220 can provide for optimizing cooking of the food item 234 by suggesting a different cooking position.

Referring to FIG. 25, the oven 220 can also use the camera 228 to determine a position of the food item 234 within the oven 220. The display 226 can be used to suggest a different cooking position for the food item 234, in order to prevent obscuring of a second food item 248. As shown, the food item 234 is provided toward a right side of the oven 220 on a top rack 230. The camera 228 is at least partially obscured from viewing the second food item 248. The display 226 can suggest an alternate cooking position, represented in broken line as a suggested position 238 by an arrow 240, in order to view and image both food items within the oven 180, so a user can inspect either food item within the oven without requiring opening of the oven door 224.

Therefore, the oven 220 can use the camera 228 to determine a position of a food item 234 and suggest an alternative position 238. Such a recommendation can alternatively provide for an alternative optimal cooking position, providing for even cooking of the food item, which can improve a user experience with the oven 220.

Figure 27:
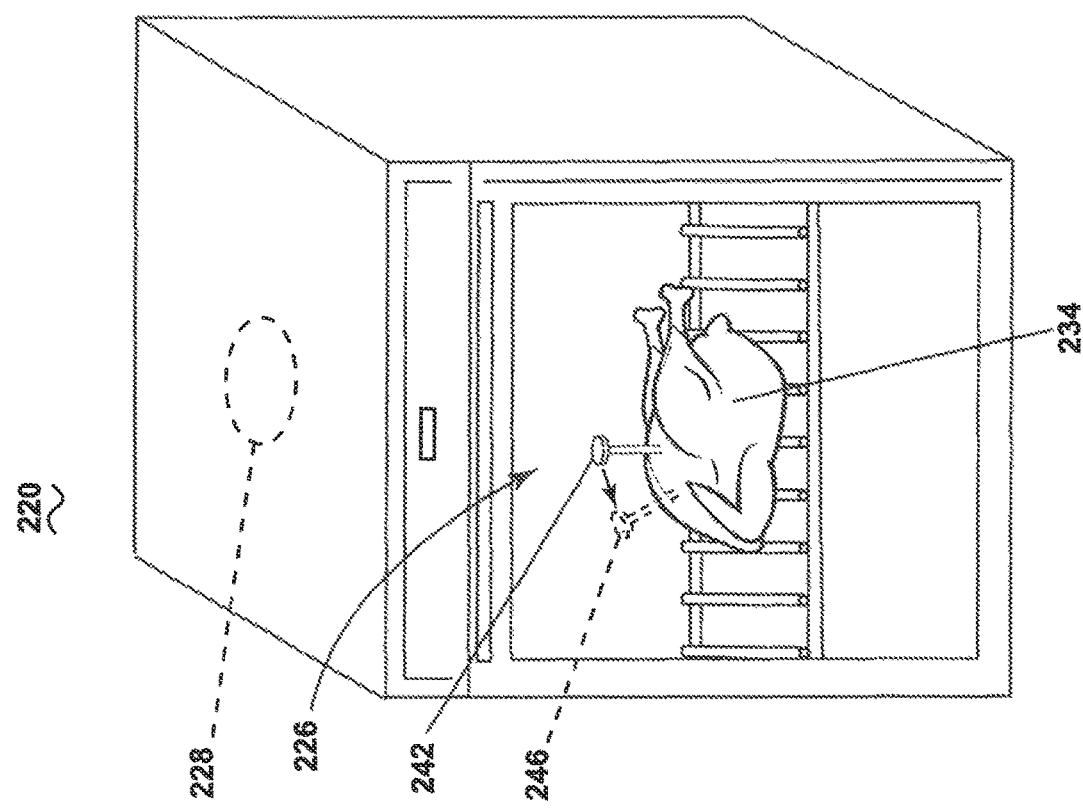
FIG. 27 is a front view of the oven of FIG. 26 illustrating an alternative position for the food probe already inserted into the food item.
Figure 26:
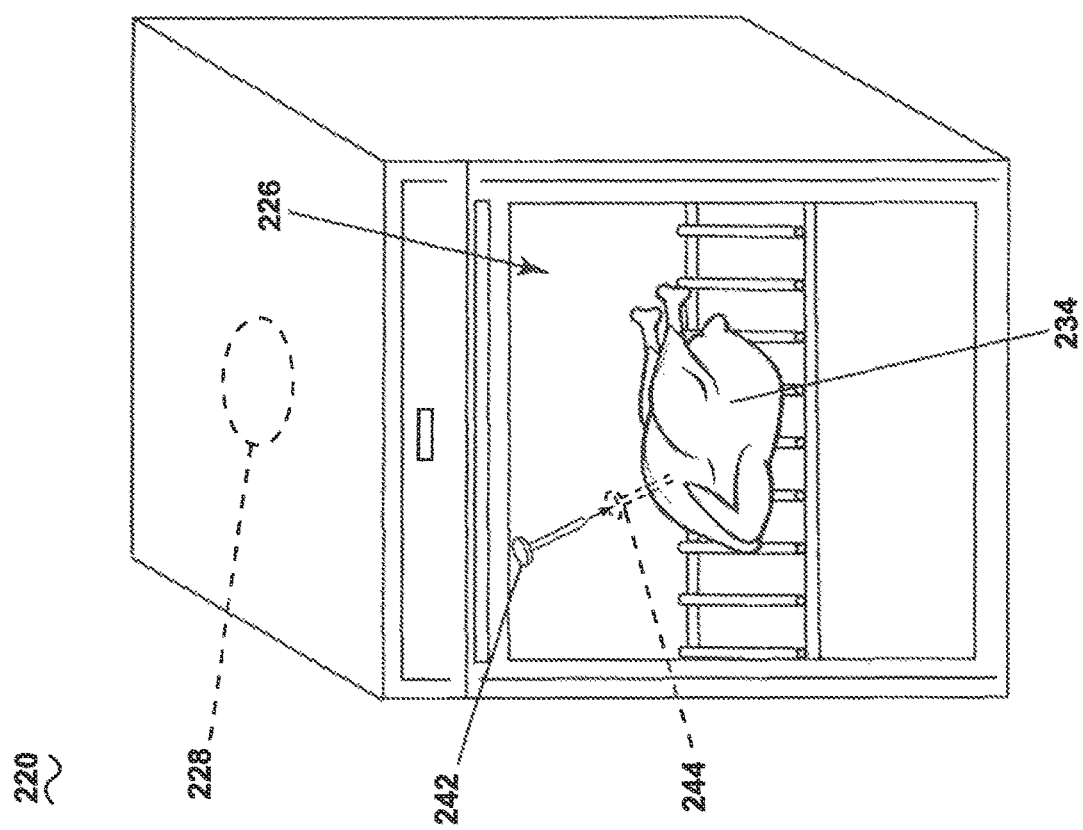
FIG. 26 is a front view of another oven with a transparent, touchscreen display illustrating an optimal position to insert a probe into a food item.

Referring now to FIG. 26, the oven 220 can further suggest an optimal position for a food probe 242. For example, the food item 234 is shown as a turkey, which can cook unevenly. Inserting the food probe 242 into the turkey as an optimal position 244 can ensure that the food item 234 is fully cooked before removal. The optimal position 244, showing the probe in broken line, can be represented on the display 226. In FIG. 27, the food probe 242 can be shown on the display, while the food item 234 is visible to a user through a transparent portion of the transparent display 226. Such a representation facilitates proper positioning of the food probe by the user to ensure proper cooking of the food item 234 after the food probe has been inserted.

The camera 228 can also image and determine a current position of the probe 242 within the food item 234. The display 226 can display an alternative food probe position 246, which can be an optimal position for the food probe 242. This ensures proper cooking of the food item 234 via temperature measurements by the probe 242. In this way, the oven 220 can provide for improved cooking of a food item 234, resulting in a better user experience with the oven.

Figure 28:
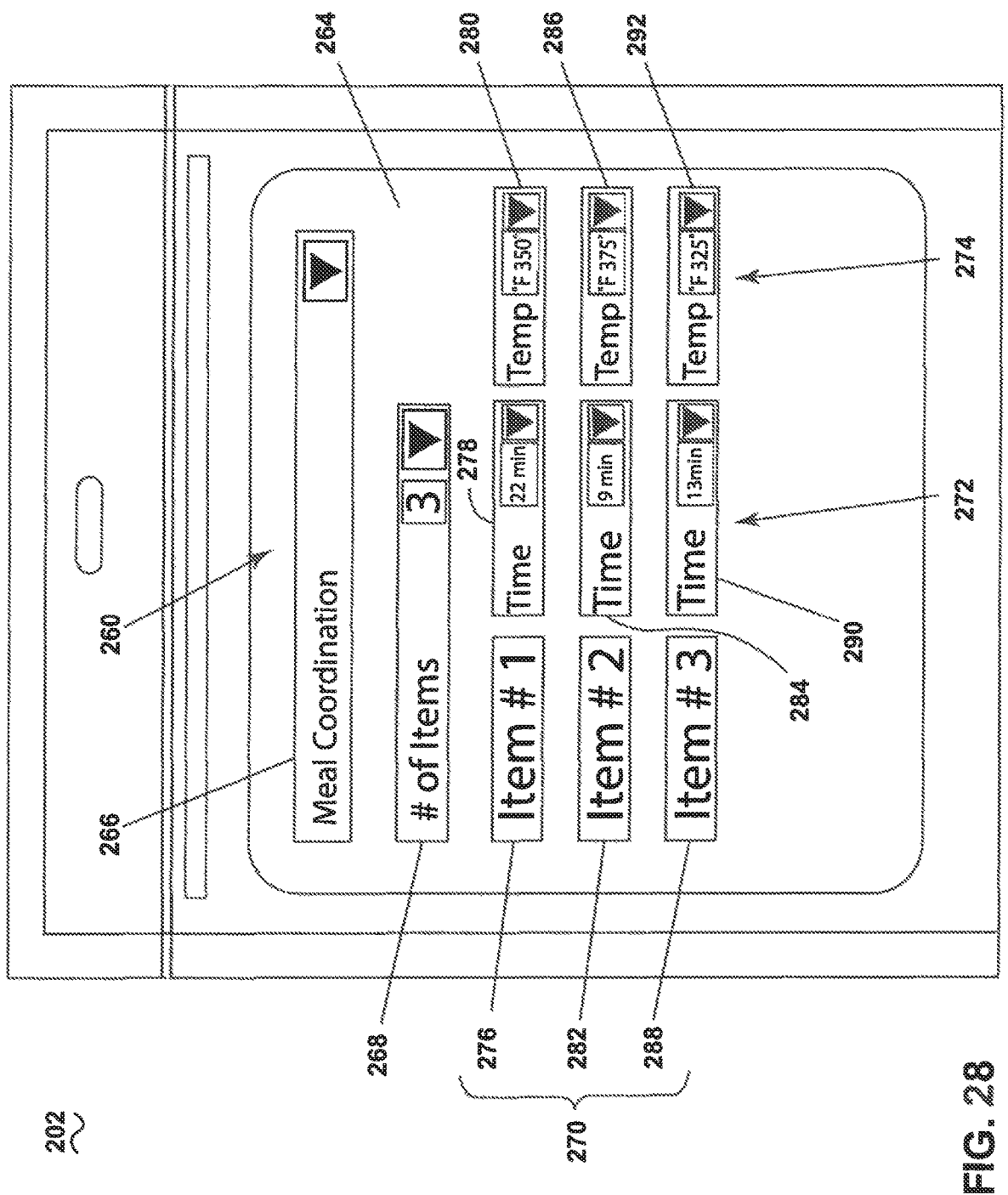
FIG. 28 is a front view of a user interface for a transparent, touchscreen display on an oven showing meal coordination for multiple different food items.

Referring to FIG. 28, an example user interface 260 for an oven 262 can be provided on a transparent, touchscreen display 264. The user interface 260 includes one or more elements, which can be displayed to a user or can be interacted with by a user. The elements include a menu bar 266, an items number bar 268, and a list of items 270. The menu bar 266 can be used with the user interface 260 to select the current format of the user interface 260, shown as a meal coordination display. The list of items 270 can include a drop-down menu or an interactive feature permitting a user to enter the particular food items to be cooked. In one example, selecting the items 270 can open a keyboard for a user to enter the particular food item. Additionally, the list of items 270 can each include a cook time 272 and a cook temperature 274. The cook time 272 and cook temperature 274 can be input by the user as optimal cooking information particular to the food item. In another example, the oven 262 can import optimal cook times and temperatures for the particular food items, such as from a database connected to the oven 262.

As shown, a first item 276 has a cook time 278 of twenty-two minutes, at a cook temperature 280 of 350-degrees. A second item 282 has a cook time 284 of 9 minutes and a cook temperature 286 of 375-degrees. A third item 288 has a cook time 290 of thirteen minutes and a cook temperature 292 of 325-degrees. The user interface 260 can provide for coordinating cooking all three items 276, 282, 288 within the same oven, to provide optimal cooking for multiple items at differing cook times and temperatures. Each cook time and temperature can be input by the user, while it is also contemplated that the oven 262 can retrieve the cook times and temperatures from a remote database, such as over the internet. Furthermore, while not depicted, the oven 262 can suggest optimal cook positions for each food item, similar to that as described in FIG. 13.

Figure 29:
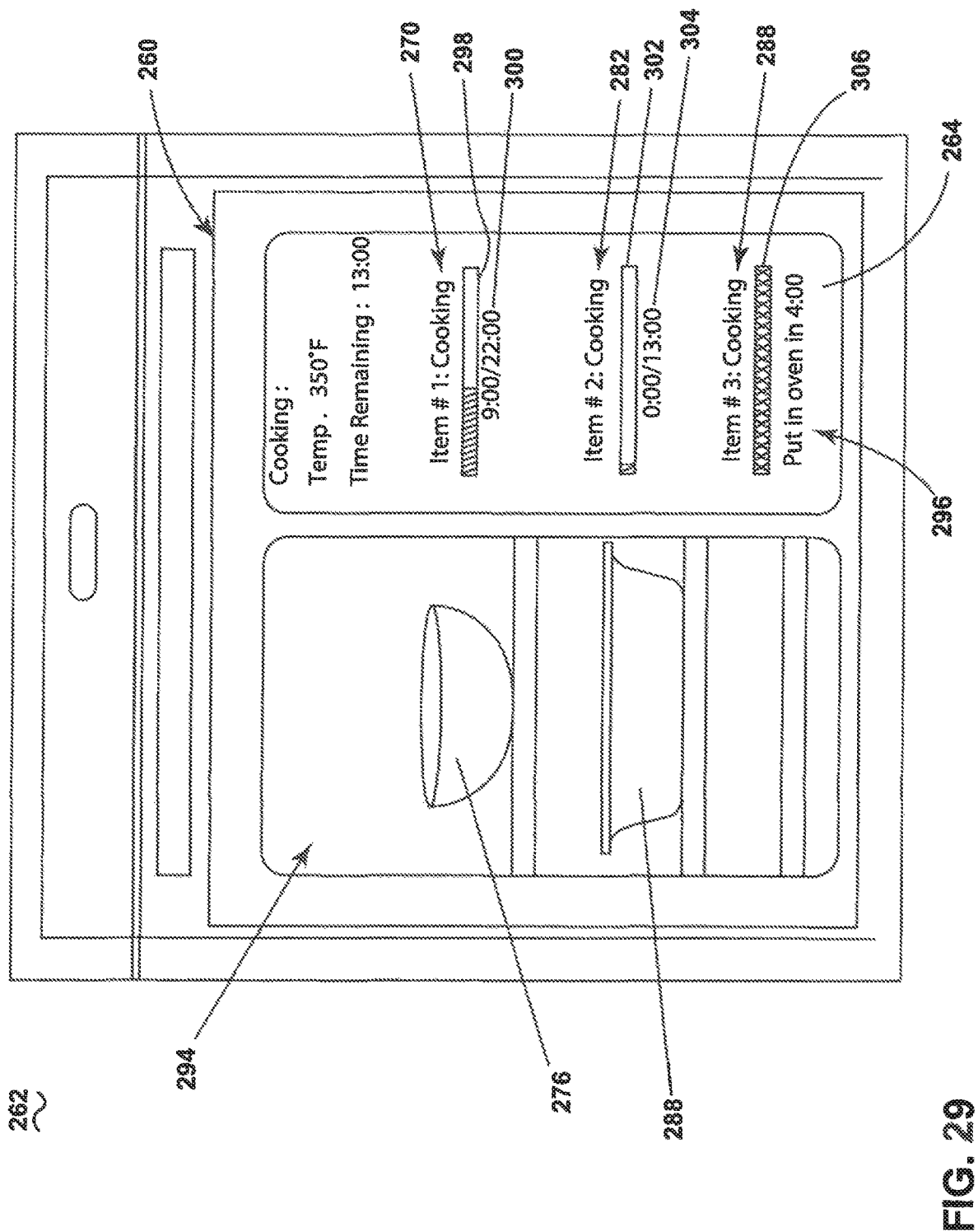
FIG. 29 is a front view of the user interface of FIG. 28 showing cooking multiple food items and coordination of the multiple food items.

Referring to FIG. 29, after the cooking coordination has been entered by the user, as shown in FIG. 28, the display 264 can depict information related to the coordination of multiple food elements, as well as providing a transparent portion 294 for viewing the food items 276, 288. The display 264 can include an information panel 296 showing the status of the multiple food items 276, 282, 288. As can be appreciated the first item 276 had the longest cook time, the second item 282 has the second longest cook time, and the third item 288 has the shortest time. The first item 276 has been placed in the oven 262 and is cooking. The cooking temperature for the oven 262 can be an optimal temperature for cooking the multiple items, shown as 350-degrees as the average cook temperature for all items. Additionally, the cook times for each item can be adjusted based upon the change in cook time to ensure proper cooking of the items among a range of temperatures.

The first item 276 can include a status bar 298 as well as a time 300, showing the current completion of the first item 276. Similarly, the second item 282 can include a status bar 302 and a time 304. Finally, as the third item 288 has not yet been placed in the oven, but can still include a status bar 306 as well as a timer indicating how much time until it is to be placed in the oven 262. Additionally, the system can be programmed to detect when the oven is or has been opened, and can updated the current cook times based upon detection of a new food item being placed in the oven with the interior camera, or strictly based upon opening or closing of the oven. Furthermore, the oven 262 can suggest a particular position for each food item within the oven 262 in order to provide the best cooking position for each individual food item. In one example, the oven 262 can suggest moving one food item as additional food items are added.

Therefore, it should be appreciated that the user can enter basic cooking information such as cook times and temperatures, and the user interface 260 can provide for automatically coordinating cooking of the multiple items to ensure optimal cooking of multiple items within the single oven 262. Similarly, it is contemplated that the user interface 260 can instruct the user of the optimal cooking positions, which may change as more cooking items are added or removed. Furthermore, it is contemplated that the oven can consider rest times for food items, which may need to rest after cooking, while additional items continue to cook. This can ensure that all items are optimally cooked, and that a full meal with multiple items can be completed at the same time, utilizing the single oven 262.

Figure 30:
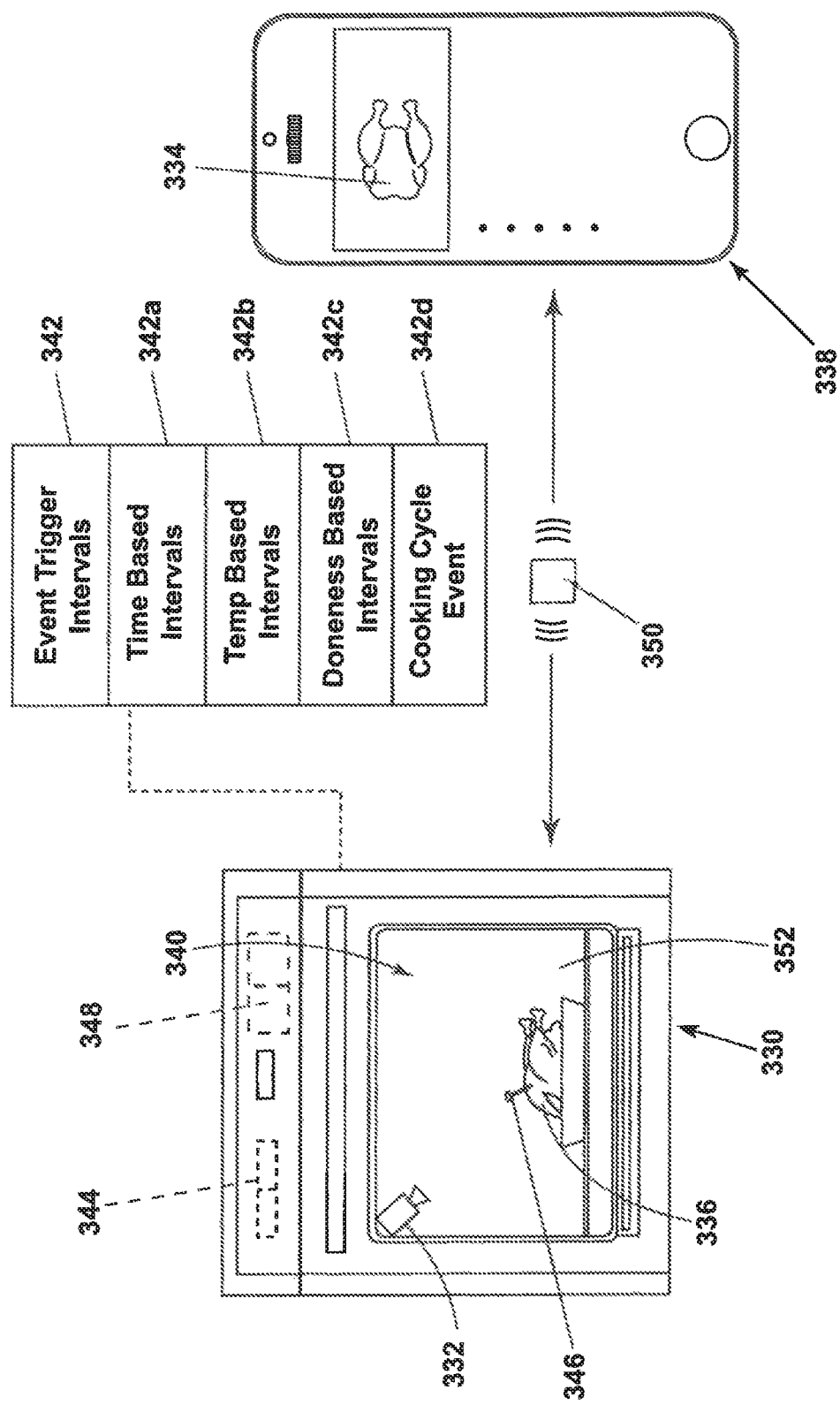
FIG. 30 is a schematic view of an oven with a transparent, touchscreen display and a mobile device displaying a view of the oven.

Referring to FIG. 30, another exemplary oven 330 leverages a camera 332 to intelligently push an image 334 of a food item 336 to a user's mobile device 338 or an oven's display 340, such as a transparent, touchscreen display, at one or more event-triggered intervals 342. Event-triggered intervals 342 can include event triggers such as time-based intervals 342a, temperature-based intervals 342b, "doneness" based intervals 342c, cooking cycle events 342d, or other intervals that can occur during the cooking process. At the event-triggered interval 342, an oven's electronic system 344 pushes the image 334 of the food item 336 over a network 350 to the user's mobile device 338 such as a smart phone or tablet or to the oven's display 340 thereby allowing the user to visually inspect the food items' 336 current status.

Additionally, it is contemplated that the oven 330, or any oven described herein, can be in communication with a recipe database or a food identification database, or both, or any other database for sending or retrieving information related to the oven 330 or operation thereof. The recipe database can be integrated with a user interface 352 provided on the display 340 to display a recipe or portions thereof to the user, guiding through the preparing and cooking of a food item or an entire meal. Additionally, it is contemplated that the oven 330 can be in communication with a food ordering or delivery service to deliver ingredients of the recipe to the user, controlled at the user interface 352. The food identification database can be incorporated through images taken at the camera 332, where such recorded images can be compared and analyzed against a database to identify the food item within the oven 330. Based upon identification, additional meal items, wines, or other pairings can be suggested at the user interface 352. More specifically, such recipe or food identification can be integrated with the transparent touchscreen display for the user interface 352, providing for viewing and interacting with the display, while optionally viewing the interior of the oven 330 simultaneously.

Examples of event-triggered intervals 342 can be any interval pre-programmed into the oven's electronic system 344 or any user-defined interval. In one non-limiting embodiment, an event-triggered interval 342 can be a time-based interval 342a such as specific time remaining in a cooking program such as when a cooking program has 2 minutes of time remaining. Another example of a time-based interval 342a might be pushing an image 334 every 5 or 10 minutes during a cooking cycle. The interval could be longer or shorter based on the cooking cycle programmed time, or, the interval or set point could be input by the user. At each event-triggered interval 342, the camera 332 can be triggered by the electronic system 344 to send the user an image 334.

In another non-limiting example, an event-triggered interval 342 can be a temperature-based interval 342b such as when the temperature of the food item 336 reaches a certain temperature or falls within a predetermined range. In this example, a sensor such as a temperature probe 346 can be inserted into the food item 336 for measuring the temperature of the food item 336. The temperature probe 346 can be in communication with the oven's electronic system 344 and when the electronic system 344 detects that the temperature of the food item is within, for example, 25 degrees of a predetermined target temperature, the event-triggered interval 342 can be triggered. The temperature degree interval could be longer or shorter, or, could be an interval input by the user. Another temperature-based interval 342b might be pushing an image 334 to a user's mobile device 338 at increments of 5 or 10 degrees during a cooking cycle or at a specific set point. Once again, the interval increments could be longer or shorter, or, the interval increments or set point could be selected by the user.

In another non-limiting example, an event-triggered interval 342 can occur at a doneness-based interval 342c such as when a level of "brownness" is achieved. For example, certain food items may brown or change color over a cooking cycle. A computing device 348 or controller, for example, in the oven's electronic system 344 can be programmed with an algorithm that can compare the brownness or color change of a food item with a desired brownness or color level pre-programmed in the electronics system 344. Once the comparison is made, the computing device 348 can be programmed to transmit an image 334 of the food item 336 at one or various brownness intervals or at intervals of increasing brownness such as every 5 or 10 degrees. In this example, the doneness-based interval can be longer or shorter, or, an interval or set point selected by the user.

As should be recognized, while the doneness-based interval 342c could be based on "brownness" or "char" of a food item, it could also be based on other indications or measurements of doneness such as internal temperature, humidity, raising of dough, bubbling, crispiness, or other indications. One or more sensors could measure one or more doneness-based indications and the oven's electronic system 344 could be programmed to trigger an event based on one or more intervals or combinations thereof.

In another non-limiting example, an event-triggered interval 342 can occur at a cooking cycle event 342d such as when flipping, stirring, mixing, adding a topping, finishing (e.g. turning on the broiler), or any other event that may require user input/interaction. For example, the oven's electronic system 344 can push an image 334 of the food item 336 to the user's mobile device 338 when the food item 336 directions require user input or interaction.

Such an event-triggered interval 342 can provide for pushing a notification to the mobile device 338. Alternatively, it is contemplated that the mobile device 338 can be used to request a 'live look' or a live image or video of the interior of the oven 330 or the food item 336, permitting a user to view the food item 336 or interior of the oven 330 on demand while remote from the oven 330.

Figure 31:
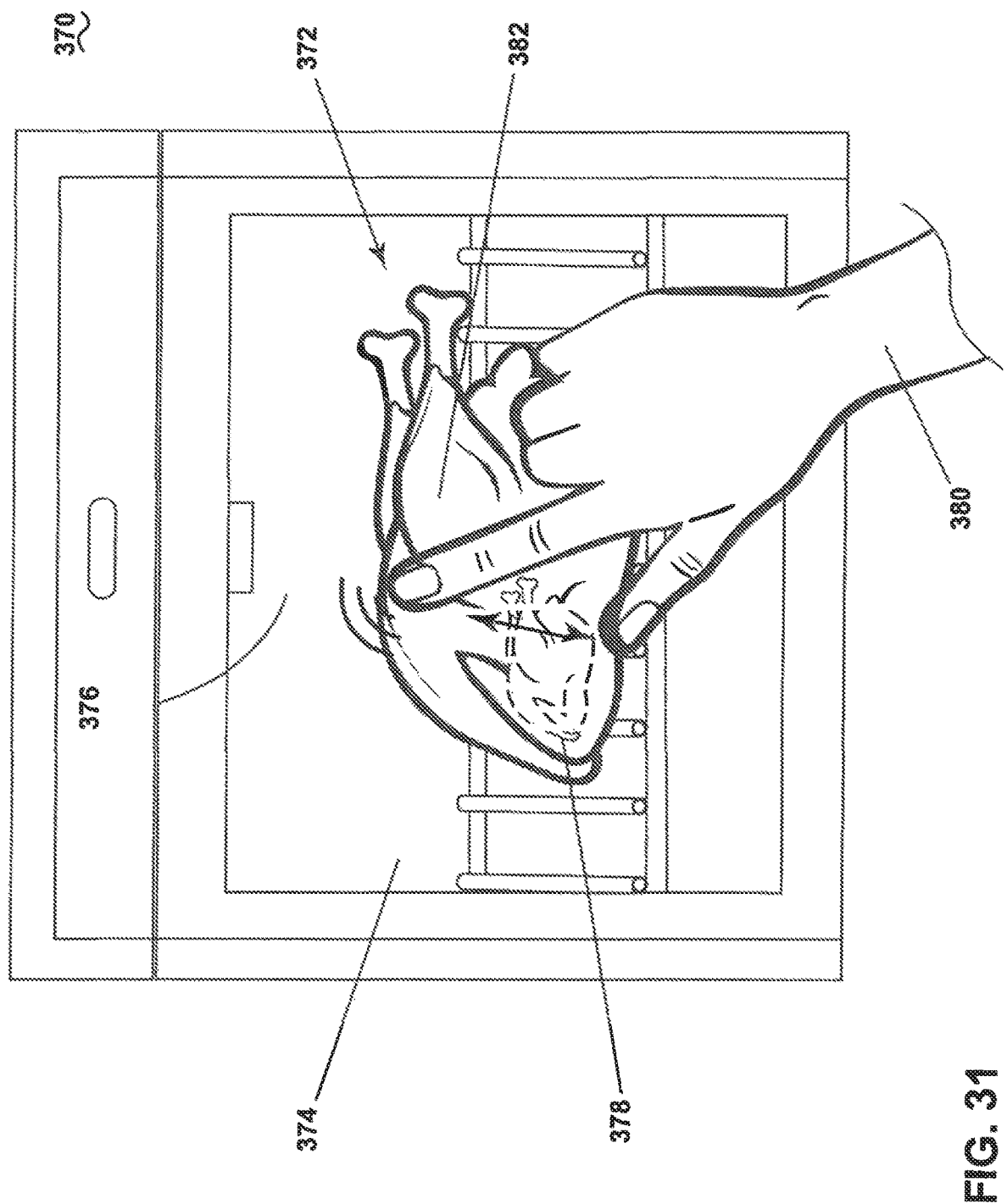
FIG. 31 is a front view of another oven with a transparent, touchscreen display illustrating touch gestures on the display.

Referring to FIG. 31, another exemplary oven 370 can include a transparent, touchscreen display 372 including an interactive user interface 374. A camera 376 can be provided on the oven 370 for imaging a food item 378 within the oven 370. The camera 376 can take or record an image of the food item 378 and provide the image to the display 372. A user 380 can interact with the transparent, touchscreen display 372 to view the food item 378 via imaging from the camera 376. In one example, the user can drag the image across the display to view different portions of the food item 378. The camera 376 can be responsive to actions by the user 380, to show the food item 378 based upon the interactions of the user 380 with the user interface 374.

Similarly, the user 380 can 'pinch' or 'pull' the screen in varying directions to zoom into or away from the food item 378. Such zooming can be recorded by the camera 376 and presented on the user interface 374. Such zooming features provide for inspection of the food item 378 by the user to check the 'doneness' of the food without requiring the user to actually open the oven, while a traditional view of the interior of the oven is not sufficient for checking on the food item 378. As can be appreciated, the user can zoom in on the turkey food item 378 to enlarge the food item 378 as an enlarged food item 382 to carefully inspect the food item 378 to check for doneness.

Additionally, with the description included herein, it is contemplated that a controller or electronics system for an oven can recognize and identify a particular food item within the oven. Such a recognition can be pulled from a database of food items, with the oven connected to the database over a network such as the internet. Additionally, the oven can record images and add to the database, so the database can 'learn', improving food identification over time.

Further aspect of the invention are provided by the subject matter of the following clauses:

1. A cooking appliance comprising: a chassis defining a cooking chamber and having an access opening; a heating element located within the chassis; a door pivotably mounted to the chassis including a window for viewing the cooking chamber through the door, and the door being movable between a closed position to close the access opening and an opened position to open the access opening; a transparent, touchscreen display provided on the door; a first camera mounted to the chassis for imaging the cooking chamber interior of the chassis and configured to generate a first signal representative an image of a food item contained within the cooking chamber for display on the transparent, touchscreen display; a second camera provided on the chassis for imaging the surrounding environment of the cooking appliance and configured to determine a position and movement of a user and generate a second signal representative of the position and movement of the user; and a controller communicatively and operably coupled to the transparent, touchscreen display, the first camera, and the second camera, and configured to receive the first signal and the second signal, and display the image of the food item contained within the cooking chamber on the transparent, touchscreen display as an augmented image of the food item that is adjustable based upon the position and movement of the user as determined by the second signal.

2. The cooking appliance of any preceding clause wherein the image is adjustable by rotating the image based upon a lateral position of the user measured by the second camera.

3. The cooking appliance of any preceding clause wherein the displayed image of the food item is resizable based upon a distance of the user from the door as measured by the first camera.

4. The cooking appliance of any preceding clause further comprising at least one light for illuminating the transparent, touchscreen display.

5. The cooking appliance of any preceding clause further comprising a gasket provided about the access opening and wherein the at least one light is provided in the gasket.

6. The cooking appliance of any preceding clause wherein the door includes an inner frame and an outer frame defining a space between the inner frame and the outer frame, and the at least one light is provided in the space to illuminate the transparent, touchscreen display.

7. The cooking appliance of any preceding clause further comprising a mask provided on the inner frame including at least one gap in the mask, and the at least one light is provided in the at least one gap.

8. The cooking appliance of any preceding clause further comprising a user interface provided on the transparent, touchscreen display.

9. The cooking appliance of any preceding clause wherein the user interface includes a transparent portion for viewing the food item within the cooking chamber through the transparent, touchscreen display.

10. The cooking appliance of any preceding clause wherein the user interface further includes a control portion for operating the cooking appliance.

11. The cooking appliance of any preceding clause wherein the control portion provides for coordinating the cooking of multiple food items by coordinating input times for multiple food items.

12. The cooking appliance of any preceding clause wherein the user interface can suggest a different position for one food item of the multiple food items to provide for imaging of the multiple food items by the first camera without visual interference of another food item by the one food item of the multiple food items as viewed by the first camera.

13. The cooking appliance of any preceding clause further comprising at least one rack provided in the cooking chamber.

14. The cooking appliance of any preceding clause wherein the transparent, touchscreen display can suggest a different position for the rack based upon a preferred cooking position for the food item.

15. The cooking appliance of any preceding clause wherein the rack and an interior of the cooking chamber are colored or coated to minimize visual interference with the transparent, touchscreen display.

16. The cooking appliance of any preceding clause further comprising a probe.

17. The cooking appliance of any preceding clause wherein the transparent, touchscreen display can suggest a preferred position of the probe within the food item on the displayed image.

18. A cooking appliance comprising: a chassis defining a cooking chamber and having an access opening; a heating element located within the chassis; a door pivotably mounted to the chassis movable between a closed position to close the access opening and an opened position to open the access opening; a transparent, touchscreen display provided on the door; an exterior camera provided on the chassis for imaging the surrounding environment of the cooking appliance and configured to determine a position and movement of a user; and a controller communicatively and operably coupled to the transparent, touchscreen display and the exterior camera to receive a signal from the exterior camera; wherein an opacity of the transparent, touchscreen display is adjusted based upon the position and movement of the user.

19. The cooking appliance of any preceding clause wherein the opacity decreases as the user moves closer to the exterior camera.

20. The cooking appliance of any preceding clause wherein the opacity increases as the user moves further from the exterior camera.

21. The cooking appliance of any preceding clause further comprising a user interface provided on the transparent, touchscreen display.

22. The cooking appliance of any preceding clause wherein the user interface includes a transparent portion for viewing a food item within the cooking chamber through the transparent, touchscreen display as the opacity decreases when the user moves closer to the exterior camera.

23. The cooking appliance of any preceding clause wherein the user interface further includes a control portion for operating the cooking appliance that decreases opacity of the transparent, touchscreen display when the user moves closer to the exterior camera.

24. The cooking appliance of any preceding clause further comprising an interior camera for imaging a food item within the cooking chamber.

25. The cooking appliance of any preceding clause wherein the transparent, touchscreen display displays the imaged food item when the position of the user moves closer to the cooking appliance.

26. A method of displaying an image of a food item on a transparent, touchscreen display for a cooking appliance including a cooking chamber, the method comprising:
  imaging a food item within the cooking chamber with an interior camera; and
  displaying the image of the food item on the transparent, touchscreen display based upon the imaging of the food item by the interior camera.

27. The method of any preceding clause wherein the displayed image of the food item is an augmented image generated by the interior camera.

28. The method of any preceding clause further comprising imaging a user with an exterior camera.

29. The method of any preceding clause further comprising adjusting an opacity for the transparent, touchscreen display based upon a distance of the user from the cooking appliance as measured by the exterior camera.

30. The method of any preceding clause further comprising adjusting the displayed image based upon a position of the user.

31. The method of any preceding clause wherein adjusting the displayed image includes rotating the image based upon a lateral position of the user relative to the cooking appliance.

32. The method of any preceding clause further comprising adjusting the size of the image of the food item based upon a distance of the user from the cooking appliance.

33. The method of any preceding clause further comprising illuminating the transparent, touchscreen display with at least one inner light.

34. The method of any preceding clause further comprising displaying, on the transparent, touchscreen display, a user interface.

35. The method of any preceding clause further comprising operating the cooling appliance via the user interface.

36. The method of any preceding clause wherein imaging the food item further includes imaging multiple food items within the cooking chamber.

37. The method of any preceding clause further comprising displaying, on the transparent, touchscreen display, information related to each food item of the multiple food items.

38. The method of any preceding clause further comprising recommending, on the transparent, touchscreen display, a different position for at least one food item of the multiple food items, such that no one food item blocks another food item of the multiple food items.

39. The method of any preceding clause further comprising recommending, on the transparent, touchscreen display, a different position of a rack in the cooking appliance, based upon the food item imaged by the interior camera.

40. The method of any preceding clause further comprising suggesting, on the transparent, touchscreen display, an optimal position for a probe inserted or to be inserted into the food item within the cooking chamber.

41. A method of displaying an image of a food item on a transparent, touchscreen display for a cooking appliance including a cooking chamber, the method comprising: imaging a food item within the cooking chamber with an interior camera; displaying the image of the food item on the transparent, touchscreen display based upon the imaging of the food item by the interior camera; and operating the cooking appliance on a user interface displayed on the transparent, touchscreen display.

42. The method of any preceding clause wherein operating the cooking appliance includes heating the cooking appliance based upon the imaged food item.

43. The method of any preceding clause wherein operating the cooking appliance based upon a cook time for the particular imaged food item.

44. The method of any preceding clause wherein the food item includes multiple food items, and operating the cooking appliance includes imaging multiple food items.

45. The method of any preceding clause further comprising scheduling cooking of the multiple food items and displaying instructions on the transparent, touchscreen display.

Furthermore, it is contemplated that a similar network connected to the oven can be used to control the oven or view the interior of the oven via a remote or mobile device. This display or user interface can be remotely provided to a mobile device so the user can operate the oven remotely or view the contents for doneness. For example, a user may wish to start the oven to preheat on the way home to save time. Alternatively, a long cook time may require a user to remain at home to monitor the food item. Remote viewing capabilities permit the user to leave the home, while remotely monitoring the food item, providing flexibility for the user to cook a food item while accomplishing other errands simultaneously.

To the extent not already described, the different features and structures of the various embodiments can be used in combination, or in substitution with each other as desired. That one feature is not illustrated in all of the embodiments is not meant to be construed that it cannot be so illustrated, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A cooking appliance comprising:
  a chassis defining a cooking chamber and having an access opening;
  a heating element located within the chassis;

a door pivotably mounted to the chassis including a window for viewing the cooking chamber through the door, and the door being movable between a closed position to close the access opening and an opened position to open the access opening;

a transparent, touchscreen display provided on the door;

a first camera mounted to the chassis for imaging the cooking chamber interior of the chassis and configured to generate a first signal representative an image of a food item and a rack contained within the cooking chamber for display on the transparent, touchscreen display; and a controller communicatively and operably coupled to the transparent, touchscreen display and the first camera, and configured to receive the first signal and display the image of the food item and the rack contained within the cooking chamber on the transparent, touchscreen display and configured to determine an alternate position of one of the food item or the rack based on the first signal and display an augmented image of the food item or the rack in the alternate position within the cooking chamber on the transparent, touchscreen display.

2. The cooking appliance of claim 1, further comprising a second camera provided on the chassis for imaging an environment surrounding the cooking appliance and configured to determine a position and movement of a user and generate a second signal representative of the position and movement of the user.

3. The cooking appliance of claim 2, wherein the controller is communicatively coupled to the second camera, and configured to receive the second signal and display the image of the food item contained within the cooking chamber on the transparent, touchscreen display as an augmented image of the food item that is adjustable based upon the position and movement of the user as determined by the second signal.

4. The cooking appliance of claim 1, wherein the controller optimizes the position of one of the cooking rack or the food item.

5. The cooking appliance of claim 4, wherein the alternate position is the optimized position.

6. The cooking appliance of claim 1, further comprising virtual arrows displayed on the touchscreen display indicating the alternate position.

7. The cooking appliance of claim 1, wherein the image is adjustable by rotating the image based upon a lateral position of the user measured by the second camera.

8. The cooking appliance of claim 1, wherein the displayed image of the food item is resizable based upon a distance of the user from the door as measured by the first camera.

9. The cooking appliance of claim 1, further comprising at least one light for illuminating the transparent, touchscreen display.

10. The cooking appliance of claim 9, further comprising a gasket provided about the access opening and wherein the at least one light is provided in the gasket.

11. The cooking appliance of claim 9, wherein the door includes an inner frame and an outer frame defining a space between the inner frame and the outer frame, and the at least one light is provided in the space to illuminate the transparent, touchscreen display.

12. The cooking appliance of claim 11, further comprising a mask provided on the inner frame including at least one gap in the mask, and the at least one light is provided in the at least one gap.

13. The cooking appliance of claim 1, further comprising a user interface provided on the transparent, touchscreen display.

14. The cooking appliance of claim 13, wherein the user interface includes a transparent portion for viewing the food item within the cooking chamber through the transparent, touchscreen display.

15. The cooking appliance of claim 13, wherein the user interface further includes a control portion for operating the cooking appliance.

16. The cooking appliance of claim 15, wherein the control portion provides for coordinating the cooking of multiple food items by coordinating input times for multiple food items.

17. The cooking appliance of claim 1, wherein the rack and an interior of the cooking chamber are colored or coated to minimize visual interference with the transparent, touchscreen display.

18. The cooking appliance of claim 1, further comprising a probe.

19. The cooking appliance of claim 18, wherein the transparent, touchscreen display suggests a preferred position of the probe within the food item on the displayed image.

* * * * *